(12) United States Patent
Micalizzi, Jr. et al.

(10) Patent No.: US 6,434,630 B1
(45) Date of Patent: Aug. 13, 2002

(54) HOST ADAPTER FOR COMBINING I/O COMPLETION REPORTS AND METHOD OF USING THE SAME

(75) Inventors: Charles Micalizzi, Jr., San Juan Capistrano; Thanh X. Nghiem, Cerritos; Richard L. Romaniec, Fountain Valley; Toan B. Nguyen, Orange, all of CA (US)

(73) Assignee: QLogic Corporation, Aliso Viejo, CA (US)

(*) Notice: Subject to any disclaimer, the term of this patent is extended or adjusted under 35 U.S.C. 154(b) by 0 days.

(21) Appl. No.: 09/282,341

(22) Filed: Mar. 31, 1999

(51) Int. Cl.[7] ........................... G06F 13/14; G06F 13/20
(52) U.S. Cl. ................... 710/5; 710/46; 710/47; 710/48; 710/54; 710/55; 710/62; 710/263
(58) Field of Search .................. 710/5, 263, 62, 710/46, 47, 48, 54, 55

(56) References Cited

U.S. PATENT DOCUMENTS

| 4,268,906 | A | | 5/1981 | Bourke et al. | |
|---|---|---|---|---|---|
| 5,129,064 | A | | 7/1992 | Fogg, Jr. et al. | |
| 5,671,365 | A | | 9/1997 | Binford et al. | |
| 5,740,467 | A | | 4/1998 | Chmielecki, Jr. et al. | |
| 5,761,427 | A | | 6/1998 | Shah et al. | |
| 5,875,343 | A | * | 2/1999 | Binford et al. | 395/736 |
| 5,881,296 | A | | 3/1999 | Williams et al. | |
| 5,892,969 | A | | 4/1999 | Young | |
| 6,006,340 | A | * | 12/1999 | O'Connell | 713/600 |
| 6,055,603 | A | * | 4/2000 | Ofer et al. | 711/113 |
| 6,085,277 | A | * | 7/2000 | Nordstrom et al. | 710/263 |
| 6,138,176 | A | * | 10/2000 | McDonald et al. | 710/6 |

FOREIGN PATENT DOCUMENTS

EP 0 738 978 A1 10/1996

OTHER PUBLICATIONS

PCT Search Report, Jul. 6, 2000.

* cited by examiner

Primary Examiner—Jeffrey Gaffin
Assistant Examiner—Rehana Perveen
(74) Attorney, Agent, or Firm—Knobbe, Martens, Olson & Bear, LLP

(57) ABSTRACT

An input/output (I/O) controller in an I/O system processes I/O requests from a host computer to a plurality of I/O devices. The I/O controller generates an interrupt to the host computer and reports a plurality of completed I/O requests from the I/O devices when at least one condition of the I/O system is met. A first condition of the I/O system comprises a predetermined ratio between the total number of unreported I/O completions by the I/O devices and the total number of remaining I/O requests from the host computer. A second condition comprises the expiration of a timer, which starts when the number of remaining I/O requests left to process for any individual I/O device reaches a predetermined minimum limit.

19 Claims, 11 Drawing Sheets

| Entry Number | 26 | Byte Number |
|---|---|---|
| 0 | IOCB | 0 |
| 1 | IOCB | 64 |
| 2 | IOCB | 128 |
| 3 | IOCB | 192 |
| 4 | IOCB | 256 |
| 5 | IOCB | 320 |
| 6 | IOCB | 384 |
| 7 ← IN-POINTER (87) | EMPTY | 448 |
| 8 | IOCB | 512 ← OUT-POINTER (88) |
| 9 | IOCB | 576 |
| 10 | IOCB | 640 |
| 11 | IOCB | 704 |

FIG. 2A

| Entry Number | 26 | Byte Number |
|---|---|---|
| 0 | EMPTY | 0 |
| 1 | EMPTY | 64 |
| 2 | EMPTY | 128 |
| 3 | EMPTY | 192 |
| 4 | EMPTY | 256 |
| 5 ← IN-POINTER (87) | EMPTY | 320 ← OUT-POINTER (88) |
| 6 | EMPTY | 384 |
| 7 | EMPTY | 448 |
| 8 | EMPTY | 512 |
| 9 | EMPTY | 576 |
| 10 | EMPTY | 640 |
| 11 | EMPTY | 704 |

FIG. 2B

| 15 14 13 12 11 10 9 8 | 7 6 5 4 3 2 1 0 | |
|---|---|---|
| ENTRY COUNT | ENTRY TYPE (22H) | 0 |
| FLAGS | HANDLE COUNT | 2 |
| HANDLE || 4 |
| HANDLE || 6 |
| HANDLE || 8 |
| HANDLE || A |
| HANDLE || C |
| HANDLE || E |
| HANDLE || 10 |
| HANDLE || 12 |
| HANDLE || 14 |
| HANDLE || 16 |
| HANDLE || 18 |
| HANDLE || 1A |
| HANDLE || 1C |
| HANDLE || 1E |
| HANDLE || 20 |
| HANDLE || 22 |
| HANDLE || 24 |
| HANDLE || 26 |
| HANDLE || 28 |
| HANDLE || 2A |
| HANDLE || 2C |
| HANDLE || 2E |
| HANDLE || 30 |
| HANDLE || 32 |
| HANDLE || 34 |
| HANDLE || 36 |
| HANDLE || 38 |
| HANDLE || 3A |
| HANDLE || 3C |
| HANDLE || 3E |

FIG. 6A

HOST ADAPTER FOR COMBINING I/O COMPLETION REPORTS AND METHOD OF USING THE SAME

BACKGROUND OF THE INVENTION

1. Field of the Invention

The present invention relates generally to a computer system. Specifically, the present invention relates to a host adapter which reduces the number of input/output (I/O) completion interrupts generated from the host adapter to a host microprocessor.

2. Brief Description of the Related Art

In a computer system, a host microprocessor (host system) or central processing unit (CPU) retrieves information from a number of peripheral I/O devices, such as disk drives, by sending an I/O request to an I/O controller or adapter. The I/O controller processes the I/O requests intended for the peripheral I/O devices. Most I/O controllers can simultaneously handle multiple I/O requests from the host microprocessor. The I/O controller processes several low-level commands associated with each I/O request. For example, for I/O devices attached to a small computer system interface (SCSI) bus, a single I/O request may include commands to arbitrate for the SCSI bus, commands to select the target I/O device, commands to request data transfer, commands to disconnect and reconnect the I/O device from the SCSI bus, and other commands to change the SCSI bus state.

In previous computer systems, after an I/O device completes an I/O request or one of the low-level commands, the I/O controller notifies the host microprocessor through a hardware interrupt. The interrupt causes the host microprocessor to determine which I/O request was completed and whether the I/O request was correctly executed. The host microprocessor must suspend other operations in order to service the interrupt from the I/O controller. Also, when the host microprocessor services each interrupt, the host microprocessor incurs an overhead or burden. The overhead is caused by the interrupt as it enters and exits the host microprocessor.

If the host microprocessor sends a large number of I/O requests, i.e., the I/O workload is high, then the host microprocessor receives a corresponding large number of interrupts, resulting in a significant amount of overhead associated with the interrupts. In a multi-user or multi-tasking computer system, this overhead decreases the amount of host microprocessor time and resources (e.g., power) available to process other applications. This results in a slowdown in system performance. As existing host microprocessors are designed to be faster, the slowdown in system performance due to the host servicing interrupts is even more noticeable.

Over the years, in addition to faster host microprocessors, the speed of peripheral I/O devices in processing I/O requests has also improved. This increased speed has increased the frequency of I/O completion interrupts to the host microprocessor.

In addition, program applications running on the host microprocessor have demanded greater processing power. Thus, there has been a greater demand for the processing power used to accomplish I/O requests and responses.

SUMMARY OF THE INVENTION

The present invention relates to a host adapter which uses an adaptive method to combine I/O request completion reports and to significantly reduce the number of interrupts to a host microprocessor. Specifically, the adapter significantly increases the ratio of I/O completion reports per second (IOPS) to interrupts.

By combining successful I/O completion reports and reducing the number of interrupts, the host adapter reduces the overhead incurred in servicing interrupts for successfully completed I/O requests. This reduces the amount of processing time ('I/O bound' time) and power spent by the host microprocessor in processing interrupts from the adapter, and creates more time and power for the host microprocessor to process user applications. In one embodiment of the present invention, the amount of time and/or resources (e.g., power) spent by the host microprocessor in servicing interrupts (CPU utilization) is decreased by 20%.

One advantage of one embodiment of the present invention is that it adapts to the I/O request workload of the host microprocessor. The busier the host microprocessor, the more I/O completion reports are returned by the adapter with a single interrupt. Specifically, the higher the I/O request workload, the higher the ratio of I/O completion reports per second (IOPS) to interrupts. For example, in one embodiment, if the workload is relatively low, e.g., only 5–10 I/O requests are generated at a time, then 3–5 I/O completion reports may be reported with a single interrupt to the host microprocessor. If the workload is relatively high, e.g., 30–60 I/O requests are generated at one time, then up to 30 I/O completion reports may be reported with a single interrupt to the host microprocessor. This provides a significant advantage because the busier the host microprocessor is, the less the host microprocessor can afford the time and resources to service interrupts and the overhead associated with interrupts.

In addition to reducing the number of interrupts to the host, another advantage of the adapter is that it maintains sufficient work for the I/O devices by starting a timer when an I/O device has no more I/O requests left to process, i.e., when an I/O device becomes 'idle.' When the timer expires, all successfully completed but unreported I/O requests from all I/O devices are posted to the host microprocessor with an interrupt. In some host applications, the host microprocessor will wait for I/O requests to be completed and reported before sending out more I/O requests. After processing these completed I/O requests, the host microprocessor may send new I/O requests to the I/O devices. This increases the likelihood that one or more new I/O requests will be sent to the I/O device which is idle. As a result, the adapter decreases latency and improves overall performance of the computer system.

Another advantage of the present invention is that one embodiment adapts to the number of I/O devices which are active at a given time. If several I/O devices are active, then a threshold value to trigger an interrupt is high. A high threshold value reduces the number of interrupts per second (IPS) and increases the number of reported I/O completions per interrupt.

Due to the adaptive nature of the present invention, it improves system performance regardless of the I/O request workload (either a high workload or a low workload), the type of access (either sequential or random access), the type of system configuration, the number of I/O devices, the type of I/O requests, and either queued or non-queued I/O requests.

One aspect of the present invention relates to a method of processing dispatched I/O requests in a computer system, in which a host microprocessor of a host computer dispatches I/O requests to an I/O controller to initiate transfers of data between the host computer and a plurality of peripheral I/O devices. The method of processing dispatched I/O requests comprises (a) processing the dispatched I/O requests by transferring data between the peripheral I/O devices and a memory of the host computer; (b) concurrently with act (a), determining, based at least upon a number of unreported completed I/O requests and a number of pending I/O requests, whether to interrupt the host microprocessor; (c) when it is determined in act (b) that the host microprocessor is to be interrupted, interrupting the host microprocessor and reporting to the host microprocessor the unreported completed I/O requests; and (d) varying the number of unreported completed I/O requests reported to the host microprocessor in act (c) according to a current workload of the I/O controller.

In one embodiment, act (b) comprises comparing the number of unreported completed I/O requests to the number of pending I/O requests. In one configuration, the method comprises interrupting the host microprocessor when the number of unreported completed I/O requests is greater than or equal to the number of pending I/O requests.

In one embodiment, act (b) of determining whether to interrupt the host microprocessor is further based on the number of pending I/O requests that correspond to each peripheral I/O device. In one configuration, the method comprises interrupting the host microprocessor if the number of pending I/O requests for one of the peripheral I/O devices reaches zero. In another configuration, the method comprises interrupting the host microprocessor if the number of pending I/O requests for one of the peripheral I/O devices reaches a predetermined, programmable number. In one configuration, each peripheral I/O device has a respective programmable number of pending I/O requests which triggers an interrupt to the host microprocessor.

In one configuration, the act of interrupting the host microprocessor if the number of pending I/O requests for a peripheral I/O device reaches zero comprises waiting a predetermined time period before interrupting the host microprocessor. The predetermined time period is selected to substantially increase a likelihood that one or more other peripheral I/O devices will complete respective pending I/O requests before the host microprocessor is interrupted. In one configuration, the predetermined time period is between about to 5 microseconds and about 8 milliseconds. In another configuration, the predetermined time period is between about to 25 microseconds and about 1,000 microseconds. In another configuration, a respective predetermined time period is selected for each peripheral I/O device. In one configuration, the predetermined time period is programmable.

Another aspect of the present invention relates to an I/O controller in a computer system, in which a host microprocessor of a host computer issues input/output (I/O) requests to the I/O controller to initiate transfers of data between the host computer and a plurality of peripheral I/O devices, and in which the I/O controller interrupts the host microprocessor to report completed I/O requests. The I/O controller comprises: a first counter configured to count a total number of remaining I/O requests from the host microprocessor; and a second counter configured to count a total number of unreported I/O requests which have been completed by the I/O devices. The I/O controller compares the number in the first counter to the number in the second counter. The I/O controller interrupts the host microprocessor when the number in the second counter is greater than or equal to the number in the first counter and reports all unreported I/O requests which have been completed by the I/O devices.

In one embodiment, the I/O controller further comprises a plurality of I/O device counters, each configured to count the number of remaining I/O requests for one of the I/O devices; and a timer with a predetermined time period. The timer is configured to start timing when one of the plurality of I/O devices completes its last I/O request, i.e., when the I/O device counter makes a 1 to 0 transition. When the timer reaches its predetermined time period, the I/O controller interrupts the host microprocessor and reports all unreported I/O requests which have been completed by the I/O devices. In one configuration, all of the counters are variables stored and updated in a random access memory associated with the I/O controller.

Another aspect of the present invention relates to a method within an I/O controller of controlling the timing with which completed I/O requests are reported to a host microprocessor in a computer system. The host microprocessor of a host computer issues input/output (I/O) requests to an I/O controller to initiate transfers of data between the host computer and a plurality of peripheral I/O devices. The I/O controller interrupts the host microprocessor to report completed I/O requests. The method comprises monitoring at least (i) a number of unreported completed I/O requests and (ii) a number of peripheral I/O devices of the plurality with pending I/O requests; based on this monitoring, determining whether to interrupt the host microprocessor to report the completed 10 requests; interrupting the host microprocessor; and reporting a variable number of completed I/O requests to the host microprocessor per interrupt.

In one embodiment, the act of determining whether to interrupt the host microprocessor to report the completed I/O requests comprises comparing the number of unreported completed I/O requests to the number of peripheral I/O devices of the plurality with pending I/O requests. In one configuration, the method comprises interrupting the host microprocessor when the number of unreported completed I/O requests is greater than or equal to the number of peripheral I/O devices with pending I/O requests.

BRIEF DESCRIPTION OF THE DRAWINGS

FIG. 2A illustrates one configuration of a full request queue within the host computing system of FIG. 1.

FIG. 2B illustrates one configuration of an empty request queue within the host computing system of FIG. 1.

FIG. 6A illustrates one configuration of a successful status entry type with 16-bit handles used by the computer system of FIG. 1.

DETAILED DESCRIPTION OF THE PREFERRED EMBODIMENT

The present invention relates to a host adapter which uses an adaptive method to combine I/O request completion reports and significantly reduce the number of interrupts to a host microprocessor.

Figure 1:
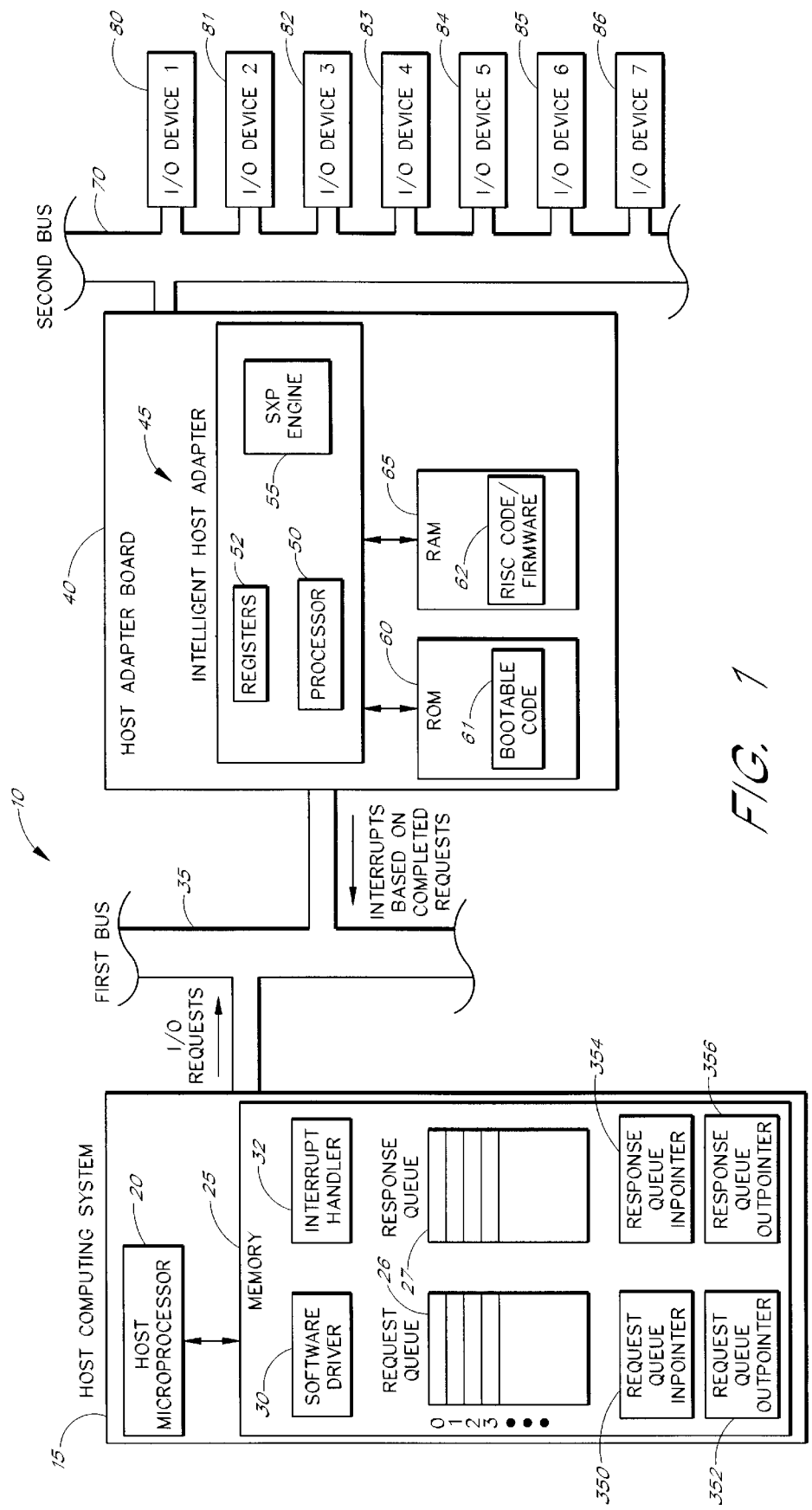
FIG. 1 illustrates a computer system comprising a host computing system, a number of peripheral I/O devices and a host adapter board in accordance with one embodiment of the present invention.

FIG. 1 illustrates a computer system 10 in accordance with one embodiment of the present invention. Due to the adaptive nature of the present invention, alternative embodiments of the computer system 10 may have system configurations which are different than the one shown in FIG. 1. In addition, alternative embodiments may have a high or low I/O request workload, sequential or random I/O access, a different number of I/O devices, and queued or non-queued I/Os.

In FIG. 1, the computer system 10 comprises a host system 15, a first bus 35, a host adapter board 40, a second bus 70, and a number of peripheral I/O devices 80–86. One of ordinary skill in the art will appreciate that there are various names and configurations for the host system 15, the host adapter board 40, the first bus 35 and the second bus 70. For example, the host system 15 may be called a central processing unit (CPU), a main microprocessor, a main processor, a main processing unit or simply a host.

HOST SYSTEM

In one configuration, the host system 15 of FIG. 1 comprises a host microprocessor 20 and a memory 25. The memory 25 comprises a software driver 30, an interrupt handler 32, a request queue 26, a response queue 27, a request queue in-pointer variable 350, a request queue out-pointer variable 352, a response queue in-pointer variable 354 and a response queue out-pointer variable 356. The software driver 30 and the interrupt handler 32 are executed by the host microprocessor 20 from the memory 25. In one configuration, the software driver 30 comprises a main application, a file system manager, at least one device driver for the peripheral I/O devices 80–86 and a host adapter driver (not shown).

At least a part of the memory 25, such as the request queue 26 and the response queue 27, may be a shared memory between the host microprocessor 20 and the host adapter board 40. The request queue 26 and the response queue 27 store command and status information related to I/O requests and I/O responses.

PCI BUS AND SCSI BUS

The first and second buses 35, 70 may be called a system bus, an I/O bus, or a network bus. In one configuration, the first bus 35 is a peripheral component interconnect (PCI) bus. In one configuration, the second bus 70 is a Small Computer Standard Interface (SCSI) bus. The second bus 70 may be any type of SCSI bus. For example, in one configuration, the SCSI bus may be a single-port bus, which supports up to 15 targets. Each target may support 1 to 32 logical units (LUNs). Thus, a single-port SCSI bus may support from 15 to 480 (15×32=480) peripheral I/O devices 80–86. In another configuration, the SCSI bus may be a dual-port bus, which supports up to 31 targets. In another configuration, the second bus 70 is a fast, ultra-wide SCSI bus. In another configuration, the second bus 70 is Fibre Channel. In one configuration, the Fibre Channel is configured to use or follow a SCSI command format or a SCSI packet format.

The first bus 35 provides communication between the host system 15 and the host adapter board 40. The second bus 70 provides communication between the host adapter board 40 and the I/O devices 80–86.

HOST ADAPTER BOARD

The host adapter board 40 and/or the host adapter 45 may be called an I/O controller, an I/O controller circuit, an I/O control system, an I/O processor, an I/O sub-processor, a communication adapter or simply a host adapter. The host adapter board 40 may be configured to be a differential adapter board, a SCSI single-ended adapter board, or a fibre channel adapter board. In one embodiment, the host adapter board 40 comprises a host adapter 45, a read-only memory (ROM) 60 and a random-access memory (RAM) 65. In one configuration, the ROM is a flash programmable ROM (PROM) which stores a bootable code 61.

In one configuration, the host adapter 45 comprises a microprocessor 50, interface registers 52 and a SCSI executive protocol (SXP) engine 55. In one configuration, the microprocessor 50 is a reduced instruction set computer (RISC).

The RAM 65 stores a RISC code or firmware 62, which is downloaded to the RAM 65 (i.e., initialized and loaded or configured) by the software driver 30 or the bootable (flash) code 61 at boot-up time. The firmware 62 is executed by the host adapter 45 to process I/O requests and commands from the host microprocessor 20. The SXP engine 55 handles low-level commands associated with I/O requests and allows the microprocessor 50 to execute other operations, such as processing other incoming I/O requests.

I/O DEVICES

The peripheral I/O devices 80–86 may be tape drives, disk drives, video disk drives (VDD), digital video disks (DVD), Redundant Arrays of Inexpensive/Independent Disks (RAID), CD-ROMs, scanners, printers, etc. For purposes of illustration, seven peripheral I/O devices 80–86 are shown in FIG. 1. But the computing system 10 may comprise less than seven or greater than seven I/O devices 80–86. Any number and/or combination of I/O devices may be used in accordance with the present invention.

GENERAL OPERATION

The general use and operation of the computer system 10 is described with reference to FIG. 1. The host microprocessor 20 and/or software driver 30 stores I/O requests, intended for the peripheral I/O devices 80–86, in the request queue 26. The adapter 45 and/or the firmware 62 retrieves the I/O requests from the request queue 26 via the PCI bus 35. In one configuration, the host adapter 45 reads the I/O requests from the host memory 25 via direct memory access (DMA). The adapter 45 can manage multiple I/O operations and data transfers without intervention from the host microprocessor 20.

The adapter 45 processes the I/O requests and sends commands via the SCSI bus 70 to the peripheral I/O devices 80–86 to retrieve or store the requested data. The host adapter 45 sends or retrieves requested data to or from the host memory 25 via direct memory access (DMA). In accordance with an adaptive method described below, the adapter 45 generates an interrupt to the host microprocessor 20 when a number or ratio of I/O requests has been completed or when a certain time period has expired after an I/O device 80–86 has no further commands to process.

REQUEST AND RESPONSE QUEUES

FIGS. 2A–2B illustrate examples of the request queue 26 within the host memory 25. The structure of the response queue 27 is substantially similar to the structure of the request queue 26 shown in FIGS. 2A–2B, except the response queue 27 is configured to contain I/O status blocks (IOSBs) while the request queue 26 is configured to contain I/O command blocks (IOCBs). In one configuration, the request queue 26 and the response queue 27 are organized as circular, fixed-length lists of 64-byte first-in-first-out (FIFO) entries. In one configuration, there are 128 entries in each queue 26, 27. In other embodiments of the present invention, the command and status information is stored in other types of data structures (e.g., stacks) instead of circular queues.

Each queue 26, 27 has an in-pointer and an out-pointer, which are implemented as indices. The memory 25 stores a set of in-pointer and out-pointer variables 350–356 (FIG. 1), and the firmware 62 of the host adapter board 40 uses a set of its own in-pointer and out-pointer variables 360–366 (FIG. 4) stored in the RAM 65. Each in-pointer and out-pointer variable 350–356 stored in the memory 25 (FIG. 1) can be converted to an address which is associated with the address of one of the 128 entries of one of the queues 26, 27.

The in-pointer and the out-pointer of a queue 26, 27 determine whether the queue 26, 27 is full, empty, or partially full. When the in-pointer of a queue 26, 27 is one less than the out-pointer of that queue 26, 27 (taking into account a wrap-around condition of a circular queue), the queue 26, 27 is full. FIG. 2A illustrates one configuration of a full request queue 26. A full queue 26, 27 contains one entry less than the total length of the queue 26, 27. When the in-pointer 87 and the out-pointer 88 are equal, the queue 26, 27 is empty. FIG. 2B illustrates one configuration of an empty request queue 26. The number of empty (available) queue entries in a particular queue 26, 27 is calculated by subtracting the in-pointer from the out-pointer (taking into account a wrap-around condition).

The request queue 26 is an interface to the host adapter 45 (and/or firmware 62) through which the host microprocessor 20 passes I/O requests for the transport of I/O command blocks (IOCBs), which comprise various commands and data. The entries of the request queue 26 are queued only by the host microprocessor 20, which controls the request queue in-pointer 87. The entries of the request queue 26 are de-queued only by the host adapter 45 (and/or firmware 62), which controls the request queue out-pointer 88.

The response queue 27 is an interface to the host microprocessor 20 through which the host adapter 45 (and/or firmware 62) passes I/O responses for the transport of I/O status blocks (IOSBs), which comprise various SCSI status and other status information regarding the I/O request. The entries of the response queue 27 are queued only by the adapter 45 (and/or the firmware 62), which controls the response queue in-pointer (not shown). The entries of the response queue 27 are de-queued only by the host microprocessor 20, which controls the response queue out-pointer (not shown).

ENTRY TYPES—REQUEST QUEUE

Figure 3A:
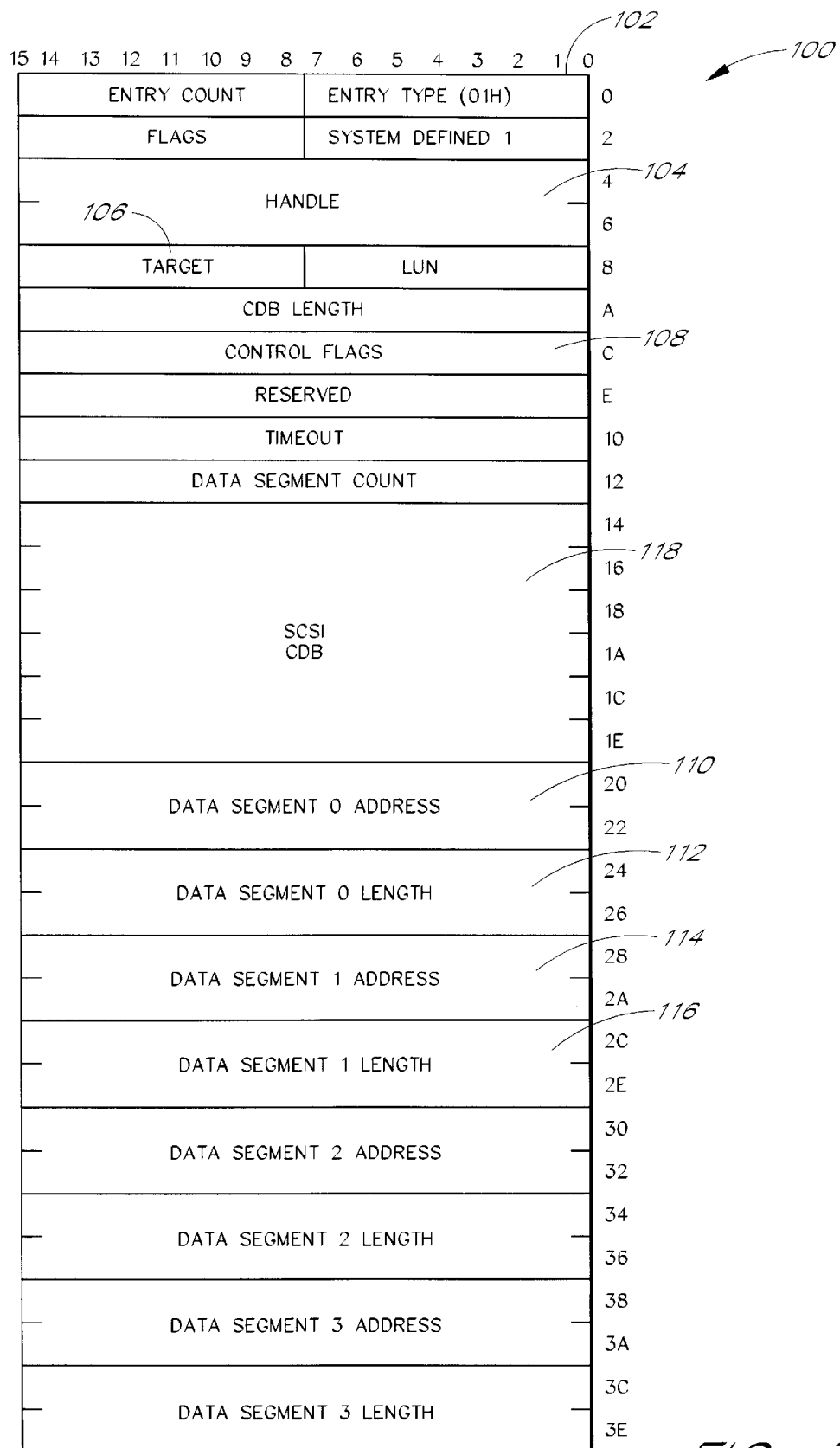
FIG. 3A illustrates one configuration of a command entry type used by the computer system of FIG. 1.
Figure 3B:
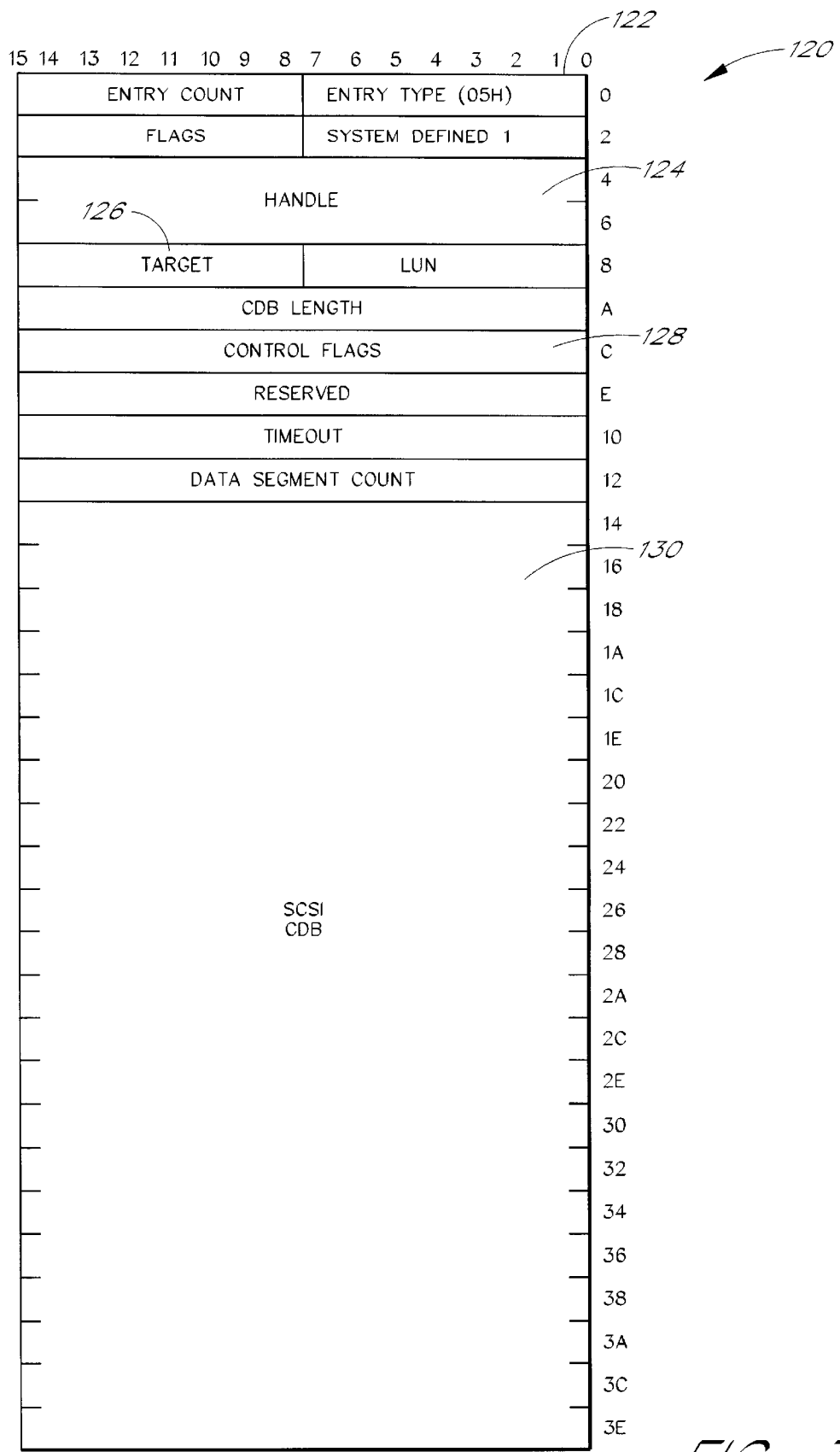
FIG. 3B illustrates one configuration of an extended command entry type used by the computer system of FIG. 1.

Each entry in the request queue 26 can hold one IOCB. An IOCB contains commands and data which the host adapter processor 50 retrieves from the host memory 25 and executes. There may be various types of IOCBs. In one configuration, the request queue 26 has at least two IOCB entry types: COMMAND and EXTENDED COMMAND. FIG. 3A illustrates one configuration of a COMMAND entry type 100, and FIG. 3B illustrates one configuration of an EXTENDED COMMAND entry type 120. The request queue 26 may also have other entry types, such as CONTINUATION, MARKER and SCAM OPERATION (not shown).

The COMMAND entry type 100 (FIG. 3A) requests transport of a SCSI command to a specified I/O device 80–86. In FIG. 3A, the COMMAND entry type 100 comprises at least seven data structures: an entry type 102; a handle 104; a target 106; control flags 108; a SCSI command descriptor block (CDB) 118; one or more data segment addresses 110, 114; and one or more data segment lengths 112, 116.

In FIG. 3A, the entry type 102 identifies the entry as a COMMAND entry type 100, versus some other entry type such as EXTENDED COMMAND. In one configuration, the entry type number for a COMMAND entry is '01H.' The handle 104 is an identifier used by the software driver 30 (FIG. 1) as part of a completion processing routine (described below) to notify the microprocessor 20 that an IOCB associated with a particular handle 104 is complete. In one configuration, the handle 104 is 16-bits long. In another configuration, the handle 104 is 32 bits long. The target 106 identifies a particular target or I/O device 80–86 which will receive the I/O command. In one configuration, the target 106 is a SCSI ID of a bridge controller (not shown) or an I/O device 80–86.

The control flags 108 direct the firmware 62 on how to execute the COMMAND entry 100. The SCSI CDB 118 contains CDB bytes sent to the target or I/O device 80–86 during a COMMAND phase. The data segment address(es) 110, 114 is a starting address of a data segment stored in the memory 25 associated with a particular read or write I/O request. The data segment length 112, 116 specifies the number of data bytes transferred to or from the data segment address stored in the memory 25 associated with the particular read or write I/O request.

The EXTENDED COMMAND entry type 120 (FIG. 3B) issues a SCSI command to a specified I/O device 80–86. In one configuration, the EXTENDED COMMAND entry type 120 contains an entry type 122, a handle 124, a target 126, control flags 128 and a SCSI CDB 130, like the COMMAND entry type 100. In one configuration, the entry type number for an EXTENDED COMMAND entry is '05H.'

ENTRY TYPES—RESPONSE QUEUE

Figure 3C:
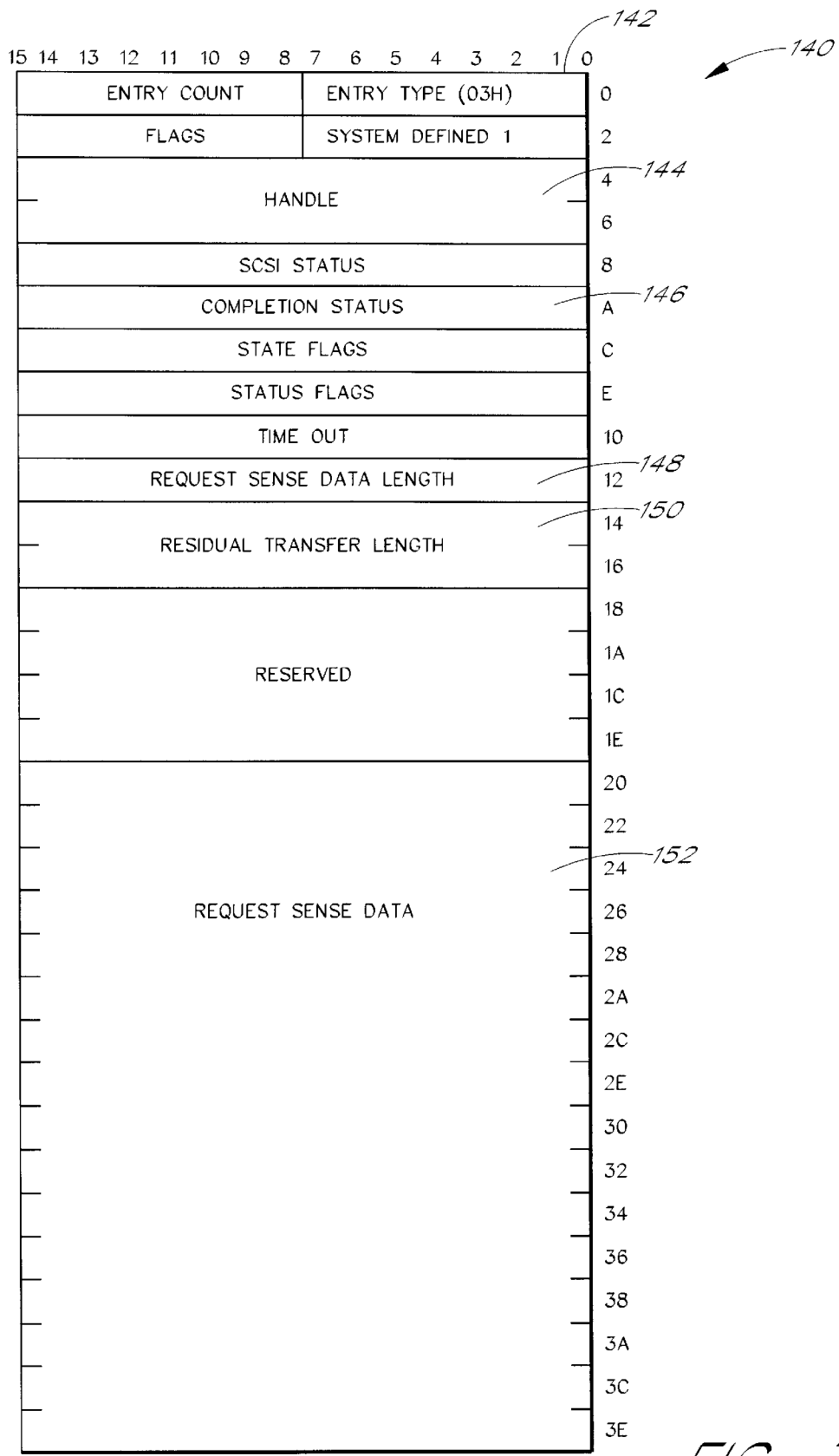
FIG. 3C illustrates one configuration of a successful/unsuccessful status entry type used by the computer system of FIG. 1.
Figure 6B:
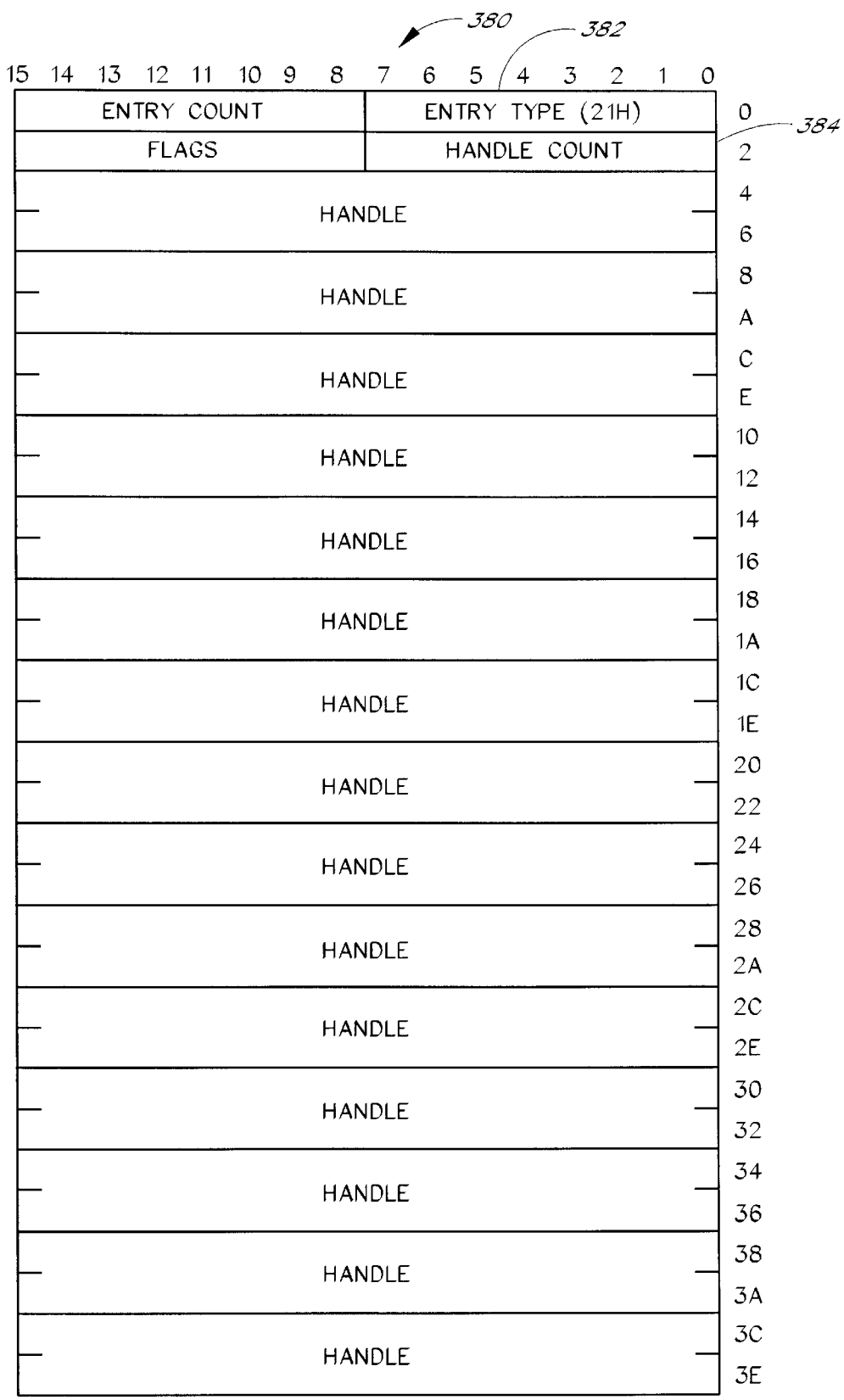
FIG. 6B illustrates one configuration of a successful status entry type with 32-bit handles used by the computer system of FIG. 1.

Each entry in the response queue 27 can hold one IOSB. An IOSB contains status information which informs the host microprocessor 20 that an I/O request is complete and whether or not the I/O request was successful. There may be different types of IOSBs. In one configuration, the response queue 27 has at least three IOSB entry types: STATUS, SUCCESSFUL STATUS with 16-bit handles and SUCCESSFUL STATUS with 32-bit handles. FIG. 3C illustrates one configuration of a STATUS entry type 140. FIG. 6A illustrates one configuration of a SUCCESSFUL STATUS entry type 370 with 16-bit handles. FIG. 6B illustrates a SUCCESSFUL STATUS entry type 380 with 32-bit handles.

The response queue 27 may have other entry types, such as an EXTENDED STATUS (not shown).

The STATUS entry type 140 (FIG. 3C) reports the completion of a COMMAND entry 100 or an EXTENDED COMMAND entry 120 and also reports whether or not the I/O request was successful. The SUCCESSFUL STATUS entry types 370, 380 report the handles of multiple IOCBs which were successful. Each COMMAND entry 100 may result in a corresponding STATUS entry 140 or a SUCCESSFUL STATUS entry 370, 380 within the response queue 27 to notify the host microprocessor 20 of the command's completion. The handle 104 of a COMMAND entry 100 or an EXTENDED COMMAND entry 120 is returned unchanged in a corresponding STATUS entry 140 or a SUCCESSFUL STATUS 370, 380 in the response queue 27.

In FIG. 3C, the STATUS entry type 140 contains an entry type 142 and a handle 144, like the COMMAND entry type 100. In one configuration, the entry type number for a STATUS entry 140 is '03H.' The STATUS entry type 140 further contains two other data structures: a completion status field 146 and a request data field 152. The completion status field 146 reports whether a transport error occurred and a description of the error if one occurred. The request data field 152 contains any data requested by the host microprocessor 20 from a particular I/O device 80–86.

In FIG. 6A, the SUCCESSFUL STATUS entry type 370 contains an entry type 372, a handle count 374 and a number of 16-bit handles corresponding to particular IOCBs which were successfully completed. In one configuration, the entry type number for a SUCCESSFUL STATUS entry 370 with 16-bit handles is '22H.' In FIG. 6B, the SUCCESSFUL STATUS entry type 380 contains an entry type 382, a handle count 384 and a number of 32-bit handles corresponding to particular IOCBs which were successfully completed. In one configuration, the entry type number for a SUCCESSFUL STATUS entry 380 with 32-bit handles is '21H.' In one configuration, the order of the handles in the SUCCESSFUL STATUS entry types 370, 380 is the same as the order of when each IOCB is successfully completed.

The entry types shown in FIGS. 3A–3C and 6A–6B are used in accordance with one embodiment of the computer system 10. Other embodiments of the computer system 10 may use different entry types than the ones described herein (COMMAND 100, EXTENDED COMMAND 120, STATUS 140, SUCCESSFUL STATUS 370, 380) or the same entry types with different data structures.

MAILBOXES

Figure 4:
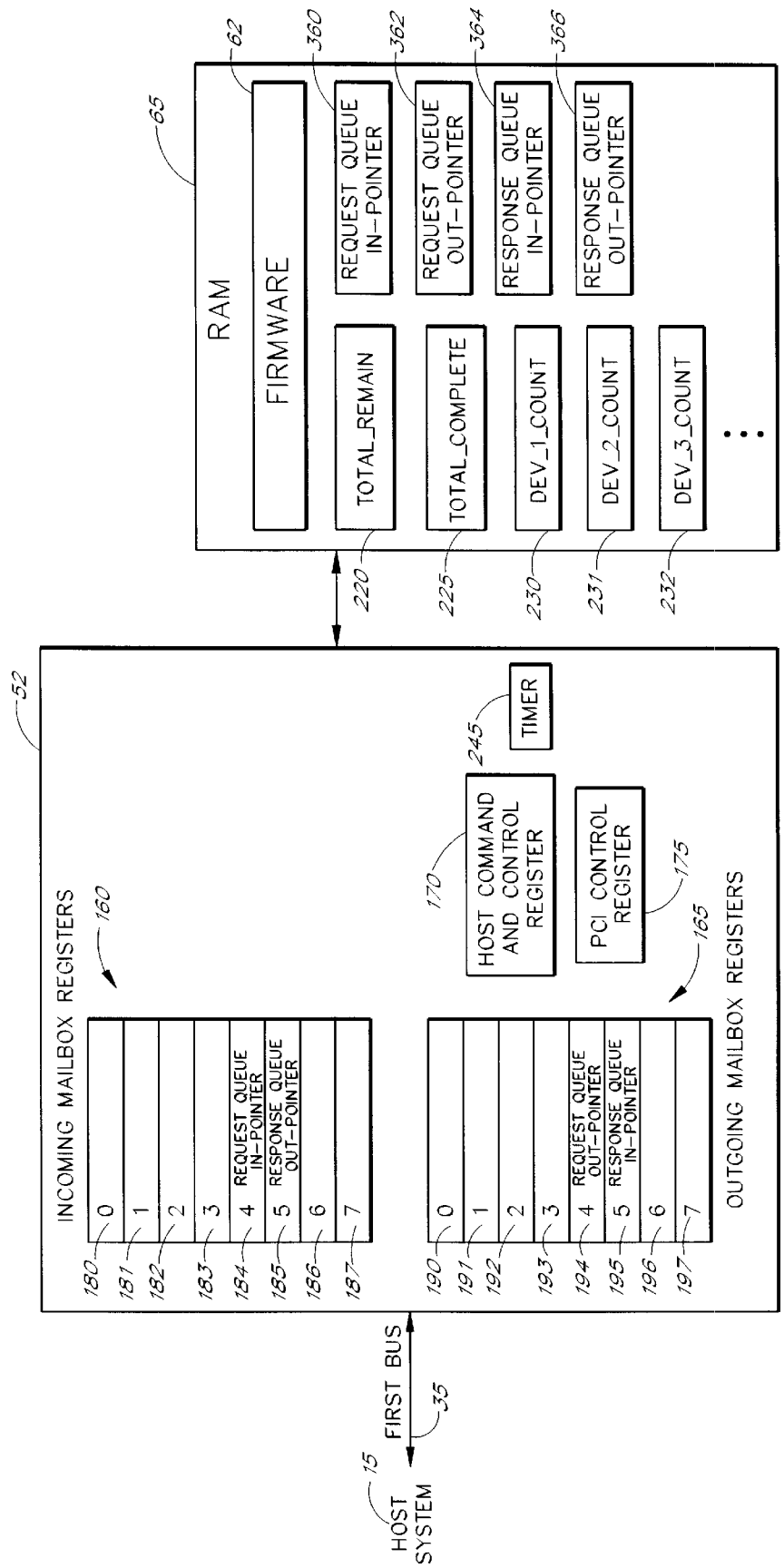
FIG. 4 illustrates one configuration of registers and variables within the host adapter board of FIG. 1.

FIG. 4 illustrates one configuration of two sets 160, 165 of internal mailbox registers 180–187, 190–197 within the interface registers 52 of FIG. 1. The adapter 45 further comprises a timer 245 as shown in FIG. 4. In one configuration, the interface registers 52 further comprises a host command and control register 170 and a PCI control register 175.

FIG. 4 also illustrates a set of variables stored in the RAM 65 of the host adapter board 40 and used by the RISC code or firmware 62. These variables include TOTAL_REMAIN 220, TOTAL_COMPLETE 225, DEV_1_1_COUNT 230, DEV_2_COUNT 231, DEV_3_COUNT 232, etc. Only three DEV_n_COUNT variables 230, 231, 232 are shown in FIG. 4 for the purposes of illustration, but in a preferred configuration, there is at least one DEV_n_ COUNT variable for each peripheral I/O device 80–86. In another embodiment, the variables TOTAL_REMAIN, TOTAL_COMPLETE, DEV_1_COUNT, DEV_2_ COUNT, DEV_3_COUNT, etc., are registers among the interface registers 52 within the adapter 45.

In one configuration, the mailbox registers 180–187, 190–197 are physical hardware registers which are accessible to the host microprocessor 20 and the adapter processor 50. In one configuration, each mailbox register 180–187, 190–197 is 16 bits long. The first set 160 of mailbox registers 180–187 comprises incoming mailbox registers, which are writable by the host microprocessor 20 and readable by the adapter firmware 62 (FIG. 1). The incoming mailbox registers 180–187 are used to transfer information from the host microprocessor 20 to the adapter processor 50 and/or the firmware 62.

The second set 165 of mailbox registers 190–197 are outgoing mailbox registers, which are writable by the adapter firmware 62 and readable by the host microprocessor 20. The outgoing mailbox registers 190–197 are used to transfer information from the adapter processor 50 and/or the firmware 62 to the host microprocessor 20.

In both mailbox register sets 160, 165 of FIG. 4, register 4 contains pointers associated with the request queue 26, and register 5 contains pointers associated with the response queue 27. Register 4 184 of the incoming mailbox register set 160 contains the in-pointer 87 for the request queue 26 (FIGS. 1–2B), which is writable by the host microprocessor 20 and readable by the adapter processor 50 (or the firmware 62). Register 4 194 of the outgoing mailbox register set 165 contains the out-pointer 88 for the request queue 26, which is writable by the adapter processor 50 (or the firmware 62) and readable by the host microprocessor 20.

Register 5 185 of the incoming mailbox register set 160 contains the out-pointer of the response queue 27 (FIG. 1), which is writable by the host microprocessor 20 and readable by the adapter processor 50 (or the firmware 62). Register 5 195 of the outgoing mailbox register set 165 contains the in-pointer of the response queue 27, which is writable by the adapter processor 50 (or the firmware 62) and readable by the host microprocessor 20.

In FIG. 4, registers 0–3, 6–7 of the incoming mailbox register set 160 may contain command information from the host microprocessor 20 to the adapter processor 50 (or the firmware 62). Registers 1–3, 6–7 of the outgoing mailbox register set 165 are configured to contain I/O status information from the adapter firmware 62 to the host microprocessor 20.

In one configuration, the registers 1–3, 6–7 191–193, 196–197 of the outgoing mailbox register set 165 may contain one or more handles of successfully completed COMMAND entries 100 (FIG. 3A) or EXTENDED COMMAND entries 120 (FIG. 3B) in the request queue 26 (FIGS. 2A–2B) of the host memory 25. In one configuration, the order of the handles in the registers 1–3, 6–7 of the outgoing mailbox register set 165 is the determined by when each IOCB is successfully completed.

In a preferred embodiment, register 0 190 of the outgoing mailbox register set 165 contains a unique code which informs the host microprocessor 20 of an event associated with an interrupt sent by the adapter firmware 62 to the host microprocessor 20. In one configuration, mailbox register 0 190 of the outgoing mailbox register set 165 is reserved to indicate what type of information is in the five available outgoing mailbox registers 1–3, 6–7. In a preferred configuration, mailbox 0 of the outgoing mailbox register set 165 informs the host microprocessor 20 of the number of outgoing mailbox registers 1–3, 6–7 which currently contain handles to successfully completed IOCBs and the size of the IOCB handles, e.g., 16 bits or 32 bits.

For example, in one configuration, mailbox 0 may contain a number '802x' or '803x,' such that 'x' is a number from one to five in '803x' which represents the number of 16-bit successfully completed IOCB handles in the available outgoing mailbox registers 1–3, 6–7. In '802x,' 'x' is a number from one to two which represents the number of 32-bit successfully completed IOCB handles in the available outgoing mailbox registers 1–2, 6–7. Thus, mailbox 0 of the outgoing mailbox register set 165 may contain information describing up to five 16-bit handles or up to two 32-bit handles in the five available outgoing mailbox registers 1–3 and 6–7.

MAILBOXES AND REQUEST QUEUE AND RESPONSE QUEUE OPERATION

The use and operation of the request and response queues 26, 27 and the mailbox registers 180–187, 190–197 is described with reference to FIGS. 1–4. The host microprocessor 20 loads one or more IOCBs (COMMAND or EXTENDED COMMAND entry types 100, 120 of FIGS. 3A–3B) into the next available entries of the request queue 26 (FIGS. 2A–2B), starting with the first available entry designated by the request queue in-pointer variable 350 (FIG. 1). The host microprocessor 20 increments the request queue in-pointer variable 350 by the number of new entries loaded into the request queue 26. The incremented request queue in-pointer variable 350 becomes the address of the next available entry within the request queue 26.

The host microprocessor 20 then writes the new value of the incremented request queue in-pointer variable 350 to mailbox register 4 184 of the incoming mailbox register set 160 (FIG. 4). The firmware 62 of the host adapter board 40 (FIG. 1) polls the mailbox register 4 184 of the incoming mailbox set 160 and compares the value in mailbox register 4 184 with the request queue in-pointer variable 360 stored in the RAM 65. When the value in mailbox register 4 184 of the incoming mailbox set 160 is different than the internal request queue in-pointer variable 360 stored in the RAM 65, the firmware 62 acknowledges that the host microprocessor 20 has added one or more new entries to the request queue 26. The firmware 62 changes the request queue in-pointer variable 360 stored in RAM 65 to equal the new value stored in mailbox register 4 184 of the incoming mailbox register set 160 and begins to process one or more IOCBs in the request queue 26. The host adapter firmware 62 retrieves (and/or temporarily saves) the IOCB(s) from the request queue 26 starting with the entry designated by the request queue out-pointer variable 362 stored within the RAM 65 (FIG. 4). The firmware 62 then increments the request queue out-pointer variable 362 by the number of IOCBs retrieved. The firmware 62 writes the incremented request queue out-pointer variable 362 into mailbox register 4 194 of the outgoing mailbox register set 165. The host microprocessor 20 may then read mailbox register 4 194 of the outgoing mailbox register set 165 to determine the position of the out-pointer 88 of the request queue 26.

The host adapter 45 processes the IOCB(s) from the request queue 26 by accessing the second bus 70 and writing or retrieving the requested information to or from the peripheral I/O devices 80–86. In a preferred embodiment, during a read I/O request, the host adapter 45 begins to transfer the retrieved data from the designated I/O device 80–86 directly to locations within the memory 25 (FIG. 1) designated by the data segment addresses 110, 114 of a COMMAND entry (FIGS. 3A, 3B).

REPORTING I/O COMPLETIONS

When I/O command completion information is ready to be processed (within the outgoing mailbox register set 165 or the response queue 27) and retrieved data, if any, is ready to be processed (within the memory 25), the host adapter 45 reports to the host microprocessor 20. There are three methods for the adapter 45 to report completed I/O requests: (1) by placing the handles of successfully completed IOCBs in the outgoing mailbox registers 1–3, 6–7 191–193, 196–197 (FIG. 4); (2) by generating STATUS entry types 140 (FIG. 3C) and transferring them to the response queue 27; or (3) by generating SUCCESSFUL STATUS entry types 370, 380 and transferring them to the response queue 27 (FIG. 1).

Each of the three methods described below is capable of reporting multiple I/O completions to the host microprocessor 20 with a single interrupt to the host microprocessor 20 or interrupt handler 32 (FIG. 1). Any one of the three methods, or any combination thereof, to report completed I/O requests may be used by the host adapter 45.

A first method to report I/O completions to the host microprocessor 20 is for the adapter firmware 62 to place the handles of successfully completed IOCBs in the outgoing mailbox registers 1–3, 6–7 191–193, 196–197 (FIG. 4). If the completed I/O requests included any read operations, the host microprocessor 20 can then process the data which was retrieved from the I/O device(s) 80–86 and stored within the memory 25. The host microprocessor 20 may read mailbox 0 190 of the outgoing mailbox register set 165 to determine the number of outgoing mailbox registers 1–3, 6–7 191–193, 196–197 which contain handles to successfully completed IOCBs and the size of the IOCB handles, e.g., 16 bits or 32 bits.

A second method to report I/O completions to the host microprocessor 20 is for the adapter firmware 62 to generate STATUS entry types 140 (FIG. 3C) within the RAM 65 and transfer the STATUS entry types 140 via direct memory access (DMA) to the response queue 27. In particular, the firmware 62 transfers the STATUS entry types 140 into one or more available entries in the response queue 27 (FIG. 1), starting with an entry designated by the response queue in-pointer variable 364 stored in the RAM 65. The STATUS entry types 140 allow the firmware 62 to report successful as well as unsuccessful completed I/O requests.

After transferring one or more STATUS entry types 140, the firmware 62 increments the response queue in-pointer variable 364 by the number of STATUS entry types 140 transferred to the response queue 27. The firmware 62 then writes the value of the incremented response queue in-pointer variable 364 into mailbox register 5 195 of the outgoing mailbox register set 165 for the host microprocessor 20 to read.

A third method to report I/O completions to the host microprocessor 20 is for the adapter firmware 62 to generate SUCCESSFUL STATUS entry types 370, 380 within the RAM 65 and transfer them 370, 380 to the response queue 27 (FIG. 1) via DMA. As described above, each SUCCESSFUL STATUS entry type 370, 380 (FIGS. 6A and 6B) may contain handles to several successfully completed I/O requests. The firmware 62 then increments the response queue in-pointer variable 364 by the number of SUCCESSFUL STATUS entry types 370, 380 transferred to the response queue 27. The firmware 62 then writes the value of the incremented response queue in-pointer variable 364 into mailbox register 5 195 of the outgoing mailbox register set 165 for the host microprocessor 20 to read.

In one configuration, it is faster to report the handles of successfully completed IOCBs via the outgoing mailbox register set 165 instead of generating STATUS or SUCCESSFUL entry types 140, 370, 380 and transferring these entry types 140, 370, 380 to the response queue 27. On the other hand, the number of successful I/O requests reported via the outgoing mailbox registers 1–3, 6–7 may be limited to the number of available registers 1–3, 6–7, which is five in the configuration shown in FIG. 4.

Also, reporting successful IOCBs via the outgoing mailbox registers 1–3, 6–7 does not inform the host microprocessor 20 of which I/O requests were unsuccessful. In a preferred embodiment, however, the host microprocessor 20 and/or the software driver 30 assumes an I/O request was unsuccessful if the host adapter 45 does not return a successful I/O completion within a predetermined time period. The software driver 30 may then begin an error recovery procedure or resend the I/O request.

In a preferred embodiment, the host adapter 45 may use either the response queue 27 or the outgoing mailbox registers 1–3, 6–7 191–193, 196–197 to report completed I/O requests, depending on the number (more than or equal to five) and status (successful/unsuccessful) of the completed I/O requests.

INTERRUPT

There are two methods in which the host adapter 45 or firmware 62 may notify the host microprocessor 20 or the interrupt handler 32 that I/O requests have been completed. In a preferred embodiment, the host adapter 45 alerts the host microprocessor 20 by generating a hardware interrupt and reporting the completed I/O requests. Alternatively, the host microprocessor 20 may poll a bit within a status register (not shown) associated with the first bus 35. The method of generating an interrupt to the host microprocessor 20 is described below.

In one configuration, when the host microprocessor 20 receives an interrupt, the host microprocessor 20 reads register 0 190 of the outgoing mailbox register set 165 to determine which one of the three aforementioned methods of reporting I/O completions is being used by the adapter firmware 62. A unique code or sequence, capable of being stored in mailbox register 0 190, is used to designate each one of the three aforementioned methods.

If the firmware 62 uses the first method, register 0 190 of the outgoing mailbox register set 165 (FIG. 4) informs the host microprocessor 20 of how many successfully completed IOCB handles are in the mailbox registers 1–3, 6–7 191–193, 196–197 of the outgoing mailbox register set 165. The host microprocessor 20 then reads mailbox registers 1–3, 6–7 191–193, 196–197 of the outgoing mailbox register set 165 to determine which IOCBs were successfully completed.

If the firmware 62 uses the second or third methods, the host microprocessor 20 reads mailbox register 5 195 of the outgoing mailbox register set 165 (FIG. 4) to determine the response queue in-pointer. The host microprocessor 20 writes the value found in outgoing mailbox register 5 195 into the response queue in-pointer variable 356 stored in memory 25 (FIG. 1). The host microprocessor 20 then reads the IOSB entries in the response queue 27 (FIG. 1) starting with the response queue out-pointer variable 356 stored in the memory 25 up to the response queue in-pointer value in mailbox register 5 195 of the outgoing mailbox register set 165. The host microprocessor 20 processes the IOSB(s) in the response queue 27, increments the response queue out-pointer variable 356 by the number of IOSBs processed, and writes the value of the incremented response queue out-pointer variable 356 to mailbox register 5 185 of the incoming mailbox register set 160 (FIG. 4).

ONE EMBODIMENT OF THE ADAPTIVE ALGORITHM

In FIG. 4, the variables TOTAL_REMAIN 220, TOTAL_COMPLETE 225, DEV_1_COUNT 230, DEV_2_COUNT 231, DEV_3_COUNT 232, etc., are determined and updated by the firmware 62. DEV_1_COUNT 230, DEV_2_COUNT 231 and DEV_3_COUNT 232 are count variables for I/O device 1 80 (FIG. 1), I/O device 2 81 and I/O device 3 82 respectively. There is at least one count variable (not shown) for each I/O device 80–86. For example, if there are 15 I/O devices, then there are at least 15 count variables.

The TOTAL_REMAIN variable 220 counts the number of total I/O requests that have not yet been processed by the I/O devices 80–86. The TOTAL_COMPLETE variable 225 counts the number of total I/O requests that have been completed by the I/O devices 80–86 but have not yet been reported to the host microprocessor 20.

The DEV_1_COUNT variable 230 counts the number of remaining I/O requests that have been received but not completed by the first I/O device 80. The DEV_2_COUNT and DEV_3_COUNT variables 231, 232 count the number of remaining I/O requests that have been received but not completed by the second and third I/O devices 81, 82 respectively. Corresponding DEV_n_COUNT variables count the number of remaining I/O requests that have been received but not completed by the fourth through seventh I/O devices 83–86 respectively.

Figure 5:
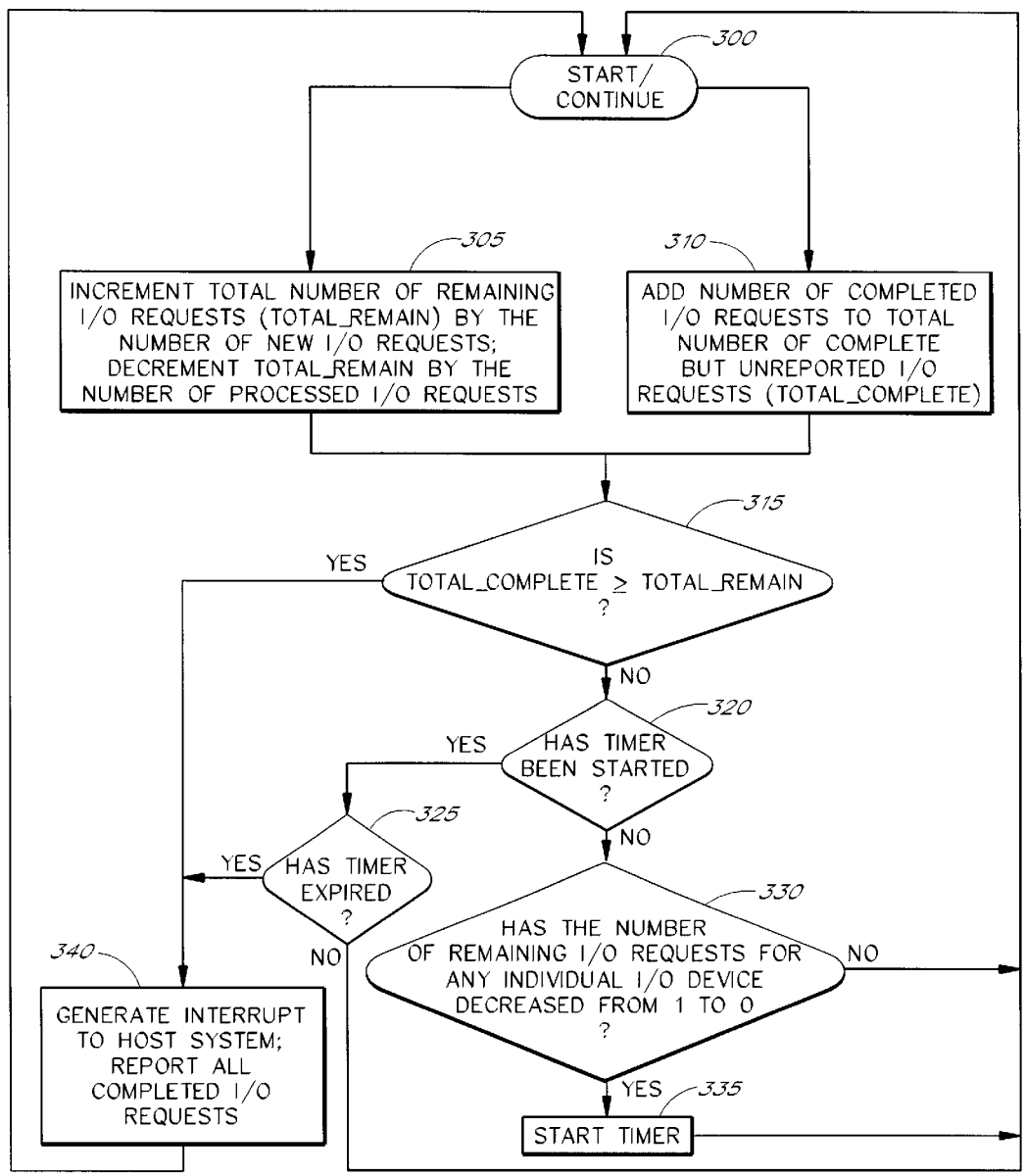
FIG. 5 illustrates one embodiment of a method used by the host adapter board of FIG. 1 to combine I/O request completion reports and reduce the number of interrupts to the host system.

FIG. 5 illustrates one embodiment of a method used by the host adapter board 40 to combine I/O request completion reports and reduce the number of interrupts to the host microprocessor 20. In one configuration, the method of FIG. 5 is a part of the RISC code or firmware 62.

The use and operation of the method of FIG. 5 is described with reference to FIGS. 1 and 4. In FIG. 5, in a start/continue block 300, the software driver 30 of the host system 15 (FIG. 1) initializes the adapter processor 50 and loads the RISC code or firmware 62. After initialization, the adapter 45 is prepared to process incoming I/O requests from the host microprocessor 20.

In a process block 305, the firmware 62 (FIG. 1) increments the TOTAL_REMAIN variable 220 by one for every new I/O request or command (IOCB) placed in the request queue 26 by the host microprocessor 20. TOTAL_REMAIN keeps a count of the number of I/O commands left to process by the I/O devices 80–86. The firmware 62 also decrements the TOTAL_REMAIN variable 220 by the number of I/O requests processed by the adapter 45 and the I/O devices 80–86.

In a process block 310, the firmware 62 increments the TOTAL_COMPLETE variable 225 by one for every I/O request that was completed by the I/O devices 80–86 but not reported to the host microprocessor 20 yet. In a decision block 315, the firmware 62 determines whether the number of unreported I/O completions (TOTAL_COMPLETE 225) is greater than or equal to the number of remaining I/O requests (TOTAL_REMAIN 220). This is called a 'first trigger' because if TOTAL_COMPLETE 225 is greater than or equal to TOTAL_REMAIN 220, then the firmware 62 generates an interrupt to the host microprocessor 20 and reports all completed but unreported I/O requests in a process block 340. The firmware 62 then returns to process block 300 and continues to increment and decrement TOTAL_REMAIN 220 and TOTAL_COMPLETE 225 accordingly.

If TOTAL_COMPLETE 225 is less than TOTAL_REMAIN 220, then the firmware 62 determines whether the timer 245 (FIG. 4) has been started in a decision block 320. If the timer 245 has been started, the firmware 62 determines whether the timer 245 has expired in a decision block 325. This is called a 'second trigger' because if the timer 245 has expired, the firmware 62 generates an interrupt to the host microprocessor 20 and reports all completed but unreported I/O requests for all I/O devices 80–86 in the process block 340. The firmware 62 also clears the TOTAL_COMPLETE variable 225 to 0. The firmware 62 then returns to the process block 300 and continues to increment and decrement TOTAL_REMAIN 220 and TOTAL_COMPLETE 225 accordingly. If the timer 245 has not expired, then the firmware 62 returns to process block 300 and continues to increment and decrement TOTAL_REMAIN and TOTAL_COMPLETE accordingly.

In a decision block 330, if the timer 245 has not started, the firmware 62 determines whether the number of remaining (uncompleted) I/O requests or commands left to process for any individual I/O device 80–86 has decremented from 1 to 0. Specifically, the firmware 62 determines whether any of the variables DEV_1_COUNT 230, DEV_2_COUNT 231, etc., have made a 1 to 0 transition. When DEV_n_COUNT is equal to zero for one of the I/O devices 80–86, that I/O device 80–86 has no further commands to process. If one of the variables DEV_1_COUNT 230, DEV_2_COUNT 231, etc., has made a 1 to 0 transition, the firmware 62 starts the timer 245 in a process block 335. Then the firmware 62 returns to process block 300 and continues to increment and decrement TOTAL_REMAIN 220 and TOTAL_COMPLETE 225 accordingly.

If none of the variables DEV_1_COUNT 230, DEV_2_COUNT 231, etc., has made a 1 to 0 transition, then the firmware 62 returns to process block 300 and continues to increment and decrement TOTAL_REMAIN 220 and TOTAL_COMPLETE 225 accordingly.

In a preferred embodiment, the timer 245 will not start if an I/O device 80–86 lies dormant and has no I/O commands to process (e.g., DEV_1_COUNT=0) for an extended period. The timer 245 starts when the number of I/O commands left to process for an I/O device 80–86 makes a 1 to 0 transition (e.g., DEV_1_COUNT changes from 1 to 0).

OTHER RATIOS CAN BE USED

In the method described above with reference to FIG. 5, when at least half of the total remaining I/O requests are completed (TOTAL_COMPLETE 225 is greater than or equal to TOTAL_REMAIN 220), the adapter 45 and the firmware 62 reports all completed but unreported I/O requests and interrupts the host microprocessor 20. This assures that the adapter 45 and the I/O devices 80–86 still have a substantial number of I/O requests (half of the total I/O requests) to process while the host microprocessor 20 processes the reported I/O completions (half of the total I/O requests).

In other embodiments, the adapter 45 uses a different ratio of the number of unreported I/O completions (TOTAL_COMPLETE 225) and the number of remaining I/O requests (TOTAL_REMAIN 220) to trigger an interrupt to the host microprocessor 20 and to report all completed but unreported I/O requests. For example, in one embodiment, the adapter 45 uses a 3-to-2 ratio of TOTAL_COMPLETE 225 to TOTAL_REMAIN 220. When TOTAL_COMPLETE 225 outnumbers TOTAL_REMAIN 220 by at least 3 to 2, the adapter 45 interrupts the host microprocessor 20 and reports all completed but unreported I/O requests to the host system 15. Other ratios, such as 2 to 1, 3 to 1, 4 to 1, 4 to 3, 1 to 2, 1 to 3, 1 to 4, 2 to 3, 3 to 4, may be implemented in accordance with the present invention.

The particular ratio of TOTAL_COMPLETE 225 to TOTAL_REMAIN 220 can be adjusted by the manufacturer or end-user depending on a variety of factors, such as the I/O request workload (either a high workload or a low workload) of the host microprocessor 20, the type of access (either sequential or random access), the type of configuration or components of the system 10, the number of I/O devices 80–86, and the type of I/O requests.

I/O DEVICE CAN STILL RECEIVE REQUESTS; TIMER DOES NOT RESTART

After the timer 245 is started, one or more new I/O requests may still be received and processed by any I/O device 80–86, including the particular I/O device 80–86 that caused the timer 245 to start. For example, if the number of remaining I/O requests left to process for the I/O device 1 80 makes a 1 to 0 transition (DEV_1_COUNT 230 decrements from 1 to 0), the firmware 62 acknowledges this 1 to 0 transition and starts the timer 245 (if I/O device 1 80 is the first I/O device 80–86 to make a 1 to 0 transition), as shown in process block 335 of FIG. 5. If the I/O device 1 80 receives a new I/O request, it will process this new I/O request. Once the I/O device 1 80 completes the new I/O request, another 1 to 0 transition is made by DEV_1_COUNT 230; but the timer 245 is not started again.

Likewise, if another I/O device 81–86 finishes processing all of its I/O requests (e.g., DEV_2_COUNT 231 makes a 1 to 0 transition) after the timer has started, the timer 245 is not reset or started again. The first I/O device 80–86 to finish all its I/O requests will typically wait the longest out of the I/O devices 80–86 for its completed I/O requests to be reported to the host system 15. Once the timer 245 starts, it will not reset (clear) until it expires or when the first trigger (TOTAL COMPLETE 225 is greater than or equal to TOTAL_REMAIN 220) causes the adapter 45 to interrupt the host microprocessor 20 and report all completed but unreported I/O requests.

In one embodiment, if the number of I/O requests left to process for all the I/O devices 80–86 never makes a 1 to 0 transition, and the first trigger (TOTAL_COMPLETE 225 is greater than or equal to TOTAL_REMAIN 220) continues to cause the adapter 45 to interrupt the host microprocessor 20 and report I/O completions, it is possible that the timer 245 may not be started for an extended period of time. In other words, the firmware 62 does not execute process block 335 in FIG. 5 for an extended period of time. The situation may occur when the workload is high (large number of I/O requests) and each I/O device 80–86 is heavily utilized by the host microprocessor 20.

DURATION OF TIMER

The duration or delay period of the timer 245 may vary according to the configuration and components of the computer system 10, particularly the I/O devices 80–86. The duration of the timer 245 may be set according to, for example, a response time of one of the I/O devices 80–86, the longest response time out of all the I/O devices 80–86, the response time of the I/O device 80–86 which is used most often, or an average of all the response times of the I/O devices 80–86. Other factors may be taken into consideration in setting the duration of the timer 245.

In one embodiment, the duration of the timer 245 is set to a value between about 5 microseconds and about 8 milliseconds. In a another embodiment, the duration of the timer 245 is set to a value between about 25 microseconds and about 1000 microseconds. In another embodiment, the duration of the timer 245 is set to a value between about 600 microseconds and about 1000 microseconds.

The typical response time for an I/O device 80–86 is about 50 microseconds. If the duration of the timer 245 is too short, then the adapter firmware 62 will reset the timer 245 and generate an interrupt to the host microprocessor 20 shortly after one I/O device 80–86 reaches zero I/O requests, followed by another interrupt shortly after another I/O device 80–86 reaches zero I/O requests. The shorter the duration of the timer 245, the less I/O completions are reported to the host microprocessor 20 per one interrupt. It is inefficient for the host adapter 45 to repeatedly interrupt the host microprocessor 20 in a short period of time.

In particular, by delaying the reporting of I/O completions for a predetermined time period after a first I/O device 80–86 completes its set of I/O requests, it is likely that one or more additional I/O devices 80–86 will also complete its set of I/O requests during the predetermined time period. It is advantageous to report the two or more sets of I/O completions together with a single interrupt, rather than report the two or more sets of completions separately with two or more separate interrupts. The host microprocessor 20 would only have to service one interrupt from the host adapter 45 instead of two or more interrupts.

For example, the I/O device 1 80 completes all of its I/O requests in 50 microseconds. The firmware 62 starts the timer 245. Then the I/O device 4 83 completes its I/O requests 50 microseconds later, and then the I/O device 2 81 completes its I/O requests 50 microseconds after that. If the timer 245 had a duration of 75 microseconds, the adapter 45 would generate one interrupt to the host microprocessor 20 and report all I/O completions of the I/O device 1 80 and the I/O device 4 83. The adapter 45 would generate a second interrupt to report the I/O completions of the I/O device 2 81. If the duration of the timer 245 was longer, e.g., 125 microseconds, then the adapter 45 would generate a single interrupt to the host microprocessor 20 and report the I/O completions of the I/O device 1 80, the I/O device 4 83 and the I/O device 2 81.

On the other hand, if the duration of the timer 245 is too long, the host microprocessor 20 may be waiting for I/O completions from the I/O devices 80–86 before sending new I/O requests, and one or more I/O devices 80–86 may be idle while they wait for more I/O requests from the host microprocessor 20. Thus, the duration of the timer 245 is preferably set to be sufficiently long to avoid multiple interrupts in a short period of time and sufficiently short to avoid extended idle time.

In one embodiment, each I/O device 80–86 may have its own respective timer duration. An I/O device 80–86 that is used frequently may have a relatively short timer duration. An I/O device 80–86 that is used less frequently may have a relatively long timer duration. In another embodiment, the duration of the timer 245 is zero for one or more of the I/O devices 80–86. In this embodiment, if an I/O device 80–86 that has a timer duration equal to zero finishes all of its I/O requests, the firmware 62 immediately generates an interrupt to the host microprocessor 20 and reports all completed but unreported I/O requests.

In another embodiment, the timer 245 starts when the number of I/O requests for one or more I/O devices 80–86 drops below a predetermined number, such as three, instead of zero, as described above with reference to FIG. 5.

The duration of the timer 245 may be set by the host microprocessor 20. In one embodiment, an end-user can set the duration of the timer 245. In another embodiment, a system designer (host computer manufacturer or adapter manufacturer) or a programmer can set the duration of the timer 245.

ADVANTAGES OF THRESHOLD TRIGGER

The method described above is adaptive: it adapts to the I/O request workload of the host microprocessor 20. The higher the I/O request workload, the higher the ratio or number of I/O completion reports per second (IOPS) per interrupt. For example, if the workload is relatively low, e.g., only 5–10 I/O requests are generated at a time, then only 3–6 completed I/O requests are reported with one interrupt to the host microprocessor 20. If the workload is relatively high, e.g., 30–60 I/O requests are generated at one time, then up to 30 completed I/O requests (with 16-bit handles) may be reported with one interrupt to the host microprocessor 20. Thus, the busier the host microprocessor 20, the more I/O completion reports are returned by the adapter 45 per each interrupt. This is a significant advantage because the busier the host microprocessor 20, the less the host microprocessor 20 can afford the time and resources to service interrupts and the overhead associated with interrupts.

ADVANTAGES OF TIMER TRIGGER

The timer 245 provides an important advantage as well. The timer 245 reduces the idle time (latency) of a particular I/O device 80–86 which has completed all of its I/O requests while other I/O devices 80–86 still have I/O requests left to process.

For example, the I/O device 1 80 may have finished all of its I/O requests (DEV_1_COUNT=0), while the other I/O devices 81–86 still have several I/O requests to complete. If TOTAL_REMAIN 220 is substantially greater than TOTAL_COMPLETE 225, the adapter 45 will not report the completed but unreported I/O requests for a substantial time. There are some software applications or subroutines run by the host microprocessor 20 which will not send a new request to one or more I/O devices 80–86, such as the I/O device 1 80, until one or more previous I/O requests have been completed and reported. This causes a delay and limits system performance. It would be inefficient for the I/O device 1 80 to remain idle for an extended period of time while the other I/O devices 81–86 have several I/O requests to process and are actively processing their I/O requests.

The timer 245 attempts to reduce the idle time of the I/O device 1 80 by causing the firmware 62, after expiration of the timer 245, to generate an interrupt to the host microprocessor 20 and report all completed but unreported I/O requests to the host system 15. This bypasses the first trigger (the total I/O completion threshold which compares TOTAL_REMAIN and TOTAL_COMPLETE). After the host microprocessor 20 processes the completed I/O requests, the host microprocessor 20 may send one or more new I/O requests for the idle I/O device 1 80 to process. Thus, the timer 245 (second trigger) complements the I/O completion threshold counter, TOTAL_COMPLETE (first trigger), by reducing the idle time of the first I/O device 80–86 which finishes all of its I/O requests at any given time.

EACH TRIGGER ALONE, OR WITH OTHER TRIGGERS

In the embodiment shown in FIG. 5, there are two triggers (block 315 and blocks 320–335) for generating an interrupt to the host microprocessor 20. Alternatively, other embodiments of the present invention only use one of the two triggers. Either of the two triggers or variations thereof can be used independently of the other to determine when to interrupt the host microprocessor 20. For example, in one embodiment, the adapter 45 only executes the method shown in blocks 300–315 and 340. In this embodiment, if TOTAL_COMPLETE 225 is not greater than or equal to TOTAL_REMAIN 220 in decision block 315, then the firmware 62 returns to the start/continue block 300.

Although other embodiments of the present invention only use one of the two triggers, better performance is achieved when the two triggers described above are used in combination. Additional triggers could be used in combination with one or both of the triggers described above. For example, an alternative trigger could determine the workload of the host microprocessor 20 without using the variable TOTAL_REMAIN 220. Another trigger could generate an interrupt to the host microprocessor 20 when the number of I/O requests for two or more I/O devices 80–86 drop below some predetermined number instead of zero.

ANOTHER EMBODIMENT OF THE ADAPTIVE ALGORITHM

Figure 7:
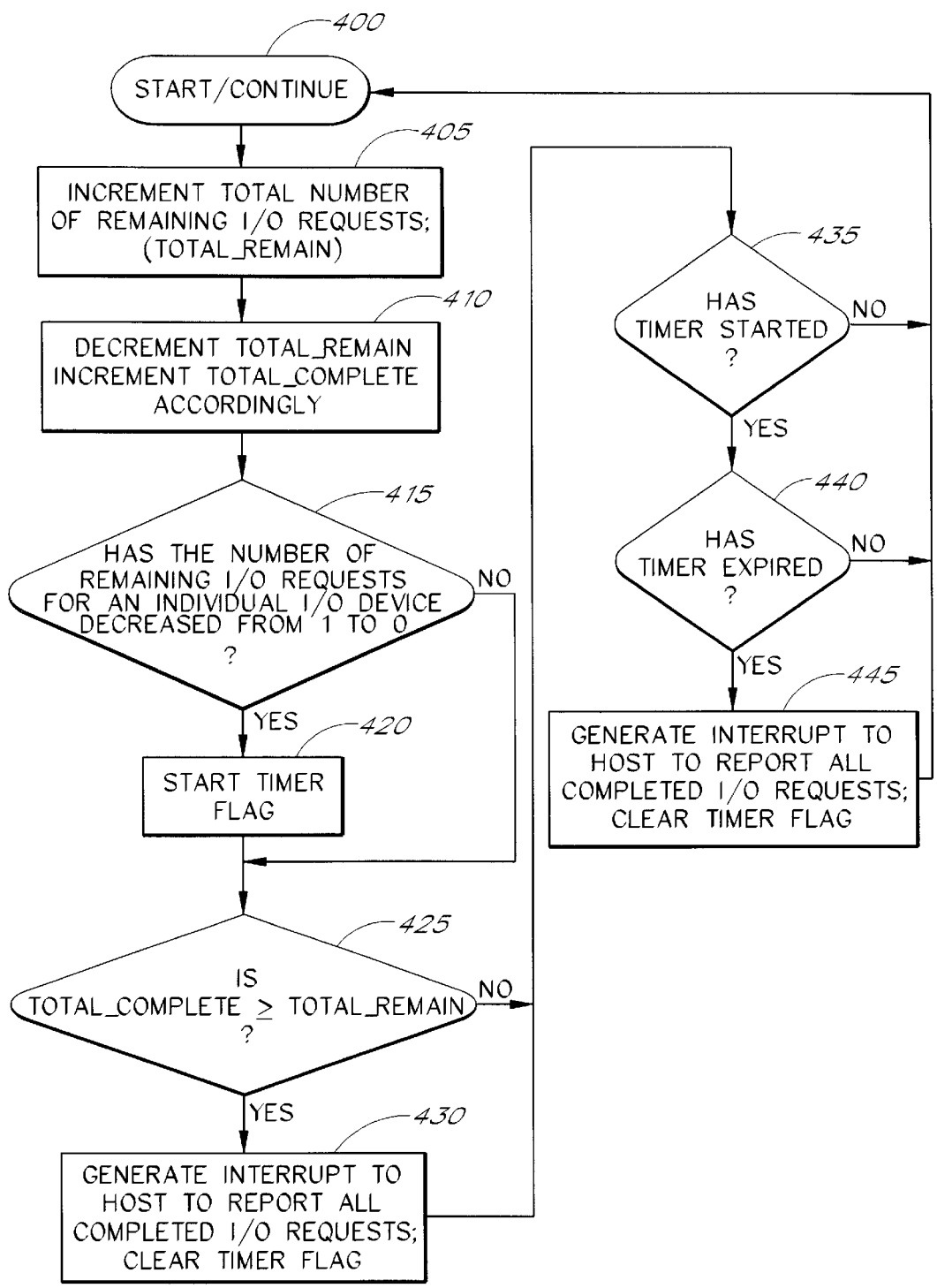
FIG. 7 illustrates another embodiment of a method used by the host adapter board of FIG. 1 to combine I/O request completion reports and reduce the number of interrupts to the host system.

FIG. 7 illustrates another embodiment of a method used by the host adapter board 40 of FIG. 1 to combine I/O request completion reports and reduce the number of interrupts to the host microprocessor 20. In one configuration, the method of FIG. 7 is a part of the RISC code or firmware 62.

The use and operation of the method of FIG. 7 is described with reference to FIGS. 1, 4 and 5. In FIG. 7, the operations shown in a start/continue block 400, a process block 405 and a process block 410, are substantially the same as the operations described above with reference to the start/continue block 300, the process block 305 and the process block 310 of FIG. 5. In FIG. 7, however, the TOTAL_REMAIN variable 220 is incremented first (for each new I/O request received in the request queue 26) in the process block 405. After the TOTAL_REMAIN variable 220 is incremented, then the variable TOTAL_REMAIN variable 220 is decremented (for each I/O request completed by the adapter 45), and the variable TOTAL_COMPLETE is incremented (for each completed but unreported I/O request by the adapter 45) as shown in the process block 410.

In a decision block 415, the firmware 62 determines whether the number of remaining I/O requests for any individual I/O device 80–86 has decreased from 1 to 0 (i.e., whether any DEV_n_COUNT variables 230–232 have made a 1 to 0 transition). If the number of remaining I/O requests for any individual I/O device 80–86 has decreased from 1 to 0, then the firmware 62 sets a start timer flag in the processor 50, as shown in a process block 420. In response, the processor 50 starts the timer 245 (FIG. 4). The firmware 62 then compares the TOTAL_COMPLETE variable 225 with the TOTAL_REMAIN variable 220, as shown in a decision block 425. In the decision block 415, if the number of remaining I/O requests for any individual I/O device 80–86 has not decreased from 1 to 0, the firmware 62 then compares the TOTAL_COMPLETE variable 225 with the TOTAL_REMAIN variable 220, as shown in the decision block 425.

In the decision block 425, if the TOTAL_COMPLETE variable 225 is greater than or equal to the TOTAL_REMAIN variable 220, then the firmware 62 generates an interrupt to the host microprocessor 20 and reports all completed but unreported I/O requests, as shown in a process block 430. In the process block 430, the firmware 62 also clears the TOTAL_COMPLETE variable 225 to 0 and clears the start timer flag. In a decision block 435, the firmware 62 then determines whether the timer 245 has started. If in the decision block 425 the TOTAL_COMPLETE variable 225 is less than the TOTAL_REMAIN variable 220, then the firmware 62 goes directly to the decision block 435 to determine whether the timer 245 has started, bypassing the process block 430.

If in the decision block 435 the timer 245 has not started, the firmware 62 continues to increment and decrement the TOTAL_REMAIN variable 220 and increment the TOTAL_COMPLETE variable 225 accordingly, as shown in the process blocks 400–410. If the timer has started, then the firmware 62 determines whether the timer 245 has expired in a decision block 440. If the timer 245 has not expired, the firmware 62 returns to the process blocks 400–410 and continues to increment and decrement the TOTAL_REMAIN variable 220 and increment the TOTAL_COMPLETE variable 225 accordingly. If the timer 245 has expired, the firmware 62 generates an interrupt to the host microprocessor 20 and reports all completed but unreported I/O requests, as shown in a process block 445. In the process block 445, the firmware 62 also clears the TOTAL_COMPLETE variable 225 to 0 and clears the start timer flag. The firmware 62 then returns to the process blocks 400–410 and continues to increment and decrement the TOTAL_REMAIN variable 220 and increment the TOTAL_COMPLETE variable 225 accordingly.

THRESHOLD BY DEVICE—FIG. 8

Figure 8:
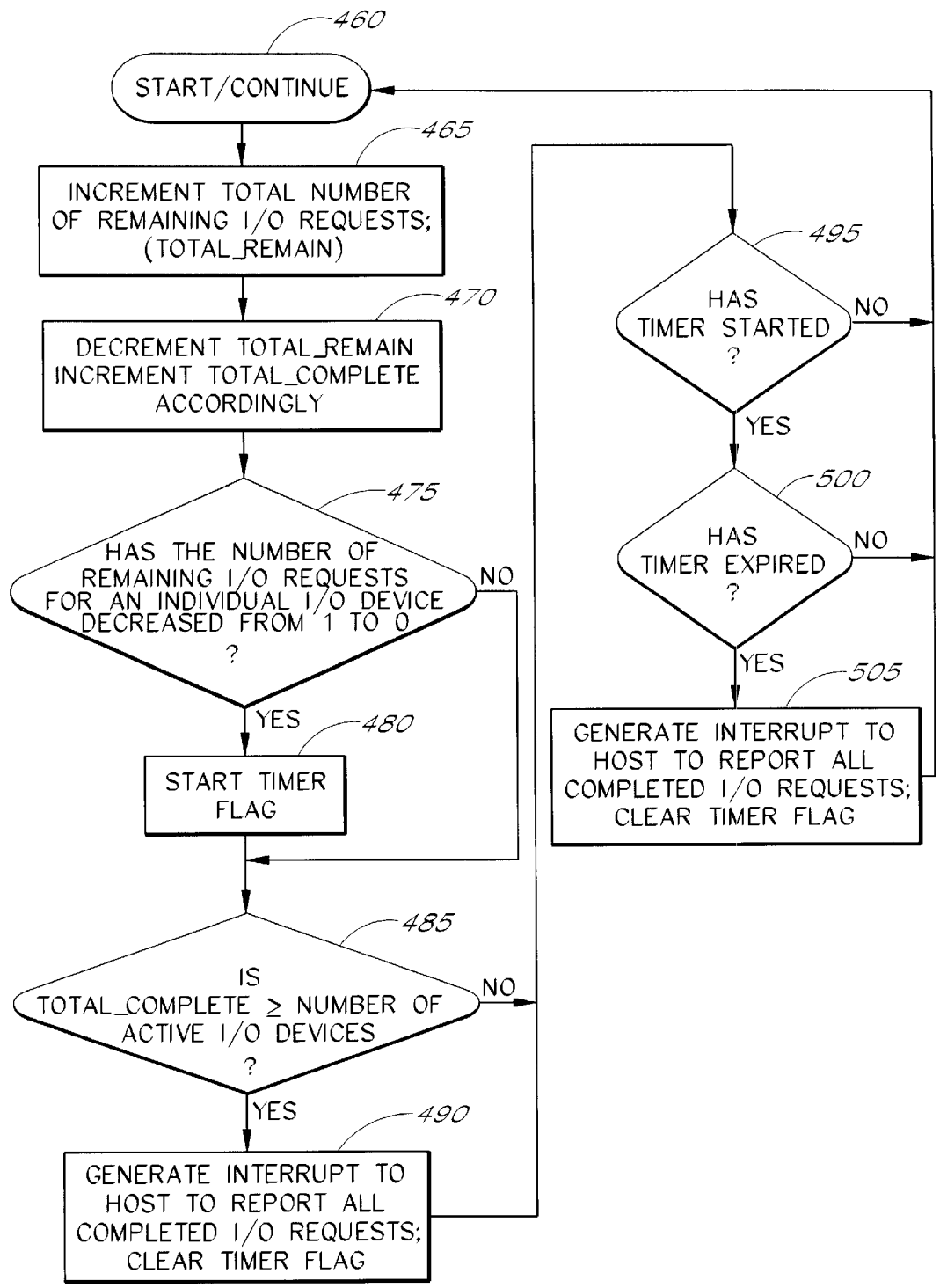
FIG. 8 illustrates another embodiment of a method used by the host adapter board of FIG. 1 to combine I/O request completion reports and reduce the number of interrupts to the host system.

FIG. 8 illustrates another embodiment of a method used by the host adapter board 40 of FIG. 1 to combine I/O request completion reports and reduce the number of interrupts to the host microprocessor 20. The embodiments described above with reference to FIGS. 1–7 may be ideally suited for host computing systems 15 using sequential I/O access. The embodiment described below with reference to FIG. 8 may be ideally suited for host computing systems 15 using random I/O access. Sequential I/O access and random I/O access are understood by those of ordinary skill in the art.

The method shown in FIG. 8 is substantially similar to the method shown in FIG. 7, except a decision block 485 in FIG. 8 is different than the decision block 425 in FIG. 7. Specifically, in the decision block 485 in FIG. 8, the firmware 62 (FIG. 1) determines whether the number of unreported I/O completions (TOTAL_REMAIN 220) is greater than or equal to the number of currently 'active' I/O devices 80–86. An 'active' I/O device 80–86 is an I/O device 80–86 that has at least one pending (uncompleted) I/O request. When an I/O device 80–86 completes its last I/O request, that I/O device 80–86 is no longer considered active, for the purposes of this embodiment, and the number of active I/O devices 80–86 decreases by 1. On the other hand, when the adapter 45 receives a new (pending) I/O request intended for a previously inactive I/O device 80–86, the number of active I/O devices 80–86 increases by 1. Thus, the number of active I/O devices 80–86 is a dynamic variable that may increase or decrease as one or more I/O devices 80–86 complete their last pending I/O request(s) or receive a first (pending) I/O request(s).

For example, if the first three I/O devices 80–82 have pending I/O requests, i.e., DEV_1_COUNT 230, DEV_

2_COUNT 231 and DEV_3_COUNT 232 are not equal to 0, then the number of currently active I/O devices 80–82 is 3. The first three I/O devices 80–82 are active for the purposes of this example, but any number or order of I/O devices 80–86 may be active at a given time. In the decision block 485 of FIG. 8, the 'threshold' value to trigger an interrupt to the host processor 20 (and report all completed I/O requests) is currently 3. If TOTAL_COMPLETE 225 is equal to 1, then TOTAL_COMPLETE 225 is not yet greater than or equal to the threshold value (number of currently active I/O devices 80–82), which is 3.

The threshold value to trigger an interrupt increases or decreases depending on the number of currently active I/O devices 80–86, as shown in block 485 of FIG. 8. As the active I/O devices 80–82 complete their assigned I/O requests, TOTAL_COMPLETE 225 increases, and the threshold value (number of currently active I/O devices 80–82) may decrease. If previously inactive I/O devices 83–86 become active, the number of active I/O devices and the threshold value may increase. If TOTAL_COMPLETE 225 is greater than or equal to the number of currently active I/O devices when the method of FIG. 8 proceeds to the decision block 485, then the firmware 62 generates an interrupt to the host microprocessor 20 and reports all completed but unreported I/O requests in a process block 490.

In the method of FIG. 8, the timer operation, i.e., the second trigger, is substantially similar as the timer operation of the method described above with reference to FIG. 7.

The variable threshold value in the method of FIG. 8 allows the host adapter 45 and the firmware 62 to adapt to the number of I/O devices 80–86 which are active at a given time. If several I/O devices 80–86 are active, then the threshold value to trigger an interrupt is relatively high. A high threshold value reduces the number of interrupts per second (IPS) and increases the number of reported I/O completions per interrupt. If a low number of I/O devices –80–86 are active, then the threshold value to trigger an interrupt is relatively low.

Thus, the methods of FIGS. 5, 7 and 8, and their threshold values to trigger interrupts to the host microprocessor 20 adapt to the I/O request workload of the host microprocessor 20 or the number of active I/O devices 80–86. The busier the host microprocessor 20 or the I/O devices 80–86, the more I/O completion reports are returned by the adapter 45 with a single interrupt. Specifically, the higher the I/O request workload or the number of active I/O devices 80–86, the higher the ratio of I/O completion reports per second (IOPS) to interrupts.

For example, in the embodiments described above with reference to FIGS. 5 or 7, if the workload is relatively low, e.g., only 5–10 I/O requests are generated at a time, then 3–5 I/O completion reports may be reported with a single interrupt to the host microprocessor 20. If the workload is relatively high, e.g., 30–60 I/O requests are generated at one time, then up to 30 I/O completion reports may be reported with a single interrupt to the host microprocessor 20. This provides a significant advantage because the busier the host microprocessor 20 is, the less the host microprocessor 20 can afford the time and resources to service interrupts and the overhead associated with interrupts.

Thus, due to its adaptive nature, the present invention may be practiced regardless of the I/O request workload (either a high workload or a low workload), the type of access (either sequential or random access), the type of system configuration, the number of I/O devices, the type of I/O requests, and either queued or non-queued I/O requests.

While embodiments and applications of this invention have been shown and described, it will be apparent to those skilled in the art that various modifications are possible without departing from the scope of the invention. It is, therefore, to be understood that within the scope of the appended claims, this invention may be practiced otherwise than as specifically described.

What is claimed is:

1. In a computer system, in which a host microprocessor of a host computer dispatches input/output (I/O) requests to an I/O controller to initiate transfers of data between the host computer and a plurality of peripheral I/O devices, a method of processing dispatched I/O requests, comprising:

(a) processing the dispatched I/O requests by transferring data between the peripheral I/O devices and a memory of the host computer;

(b) concurrently with act (a), dynamically determining, based at least upon a number of unreported completed I/O requests and a number of pending I/O requests, whether to interrupt the host microprocessor;

(c) when it is determined in act (b) that the host microprocessor is to be interrupted, interrupting the host microprocessor and reporting to the host microprocessor the unreported completed I/O requests; and (d) varying the number of unreported completed I/O requests reported to the host microprocessor in act (c) according to a current workload of the I/O controller.

2. The method of claim 1, wherein act (b) comprises comparing the number of unreported completed I/O requests to the number of pending I/O requests.

3. The method of claim 2, wherein the method comprises interrupting the host microprocessor when the number of unreported completed I/O requests is greater than or equal to the number of pending I/O requests.

4. The method of claim 1, wherein act (b) of determining whether to interrupt the host microprocessor is further based on the number of pending I/O requests that correspond to each peripheral I/O device.

5. The method of claim 4, wherein the method comprises interrupting the host microprocessor if the number of pending I/O requests for one of the peripheral I/O devices reaches zero.

6. The method of claim 4, wherein the method comprises interrupting the host microprocessor if the number of pending I/O requests for one of the peripheral I/O devices reaches a predetermined, programmable number.

7. The method of claim 6, wherein each peripheral I/O device has a respective programmable number of pending I/O requests which triggers an interrupt to the host microprocessor.

8. The method of claim 5, wherein the act of interrupting the host microprocessor if the number of pending I/O requests for a peripheral I/O device reaches zero comprises waiting a predetermined time period before interrupting the host microprocessor, the predetermined time period selected to substantially increase a likelihood that one or more other peripheral I/O devices will complete respective pending I/O requests before the host microprocessor is interrupted.

9. The method of claim 8, wherein the predetermined time period is between about to 5 microseconds and about 8 milliseconds.

10. The method of claim 8, wherein the predetermined time period is between about to 25 microseconds and about 1,000 microseconds.

11. The method of claim 8, wherein a respective predetermined time period is selected for each peripheral I/O device.

12. The method of claim 8, wherein the predetermined time period is programmable.

13. In a computer system, in which a host microprocessor of a host computer issues input/output (I/O) requests to an I/O controller to initiate transfers of data between the host computer and a plurality of peripheral I/O devices, and in which the I/O controller interrupts the host microprocessor to report completed I/O requests, a method within the I/O controller of controlling the timing with which completed I/O requests are reported to the host microprocessor, comprising:

dynamically monitoring at least (i) a number of unreported completed I/O requests, (ii) a total number of pending I/O requests, and (iii) a number of pending I/O requests that correspond to each peripheral I/O device of the plurality;

based on said act of monitoring, determining whether to interrupt the host microprocessor to report the completed I/O requests; and reporting a variable number of completed I/O requests to the host microprocessor per interrupt.

14. In a computer system, in which a host microprocessor of a host computer issues input/output (I/O) requests to an I/O controller to initiate transfers of data between the host computer and a plurality of peripheral I/O devices, and in which the I/O controller interrupts the host microprocessor to report completed I/O requests, the I/O controller comprising:

a first counter configured to count a total number of remaining I/O requests from the host microprocessor; and a second counter configured to dynamically count a total number of unreported I/O requests which have been completed by the I/O devices, said I/O controller comparing the number in the first counter to the number in the second counter, said I/O controller interrupting the host microprocessor when the number in the second counter is greater than or equal to the number in the first counter and reporting all unreported I/O requests which have been completed by the I/O devices.

15. The I/O controller of claim 14, further comprising:

a plurality of I/O device counters, each counter configured to count the number of remaining I/O requests for one of the I/O devices; and a timer with a predetermined time period configured to start timing when one of the plurality of I/O device counters makes a 1 to 0 transition, said I/O controller interrupting the host microprocessor when the predetermined time period of the timer expires and reports all unreported I/O requests which have been completed by the I/O devices.

16. The I/O controller of claim 14, wherein all the counters are variables stored and updated in a random access memory associated with the I/O controller.

17. In a computer system, in which a host microprocessor of a host computer issues input/output (I/O) requests to an I/O controller to initiate transfers of data between the host computer and a plurality of peripheral I/O devices, and in which the I/O controller interrupts the host microprocessor to report completed I/O requests, a method within the I/O controller of controlling the timing with which completed I/O requests are reported to the host microprocessor, comprising:

dynamically monitoring at least (i) a number of unreported completed I/O requests and (ii) a number of peripheral I/O devices of the plurality with pending I/O requests;

based on said act of monitoring, determining whether to interrupt the host microprocessor to report the completed I/O requests;

interrupting the host microprocessor; and reporting a variable number of completed I/O requests to the host microprocessor per interrupt.

18. The method of claim 17, wherein the act of determining whether to interrupt the host microprocessor to report the completed I/O requests comprises comparing the number of unreported completed I/O requests to the number of peripheral I/O devices of the plurality with pending I/O requests.

19. The method of claim 18, wherein the method comprises interrupting the host microprocessor when the number of unreported completed I/O requests is equal to the number of peripheral I/O devices of the plurality with pending I/O requests.

* * * * *